(12) United States Patent
Hyde et al.

(10) Patent No.: US 9,740,638 B2
(45) Date of Patent: *Aug. 22, 2017

(54) SYSTEMS AND METHODS FOR PREVENTING DATA REMANENCE IN MEMORY

(71) Applicant: Elwha LLC, Bellevue, WA (US)

(72) Inventors: Roderick A. Hyde, Redmond, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,572

(22) Filed: Jan. 7, 2016

(65) Prior Publication Data

US 2016/0117264 A1    Apr. 28, 2016

Related U.S. Application Data

(63) Continuation of application No. 14/584,974, filed on Dec. 29, 2014, now Pat. No. 9,235,726, which is a
(Continued)

(51) Int. Cl.
*H04L 29/06* (2006.01)
*G06F 12/14* (2006.01)
(Continued)

(52) U.S. Cl.
CPC ........ *G06F 12/1408* (2013.01); *G06F 3/0623* (2013.01); *G06F 3/0629* (2013.01);
(Continued)

(58) Field of Classification Search
CPC .. G06F 12/1408; G06F 3/0623; G06F 3/0629; G06F 3/0673; G06F 21/00;
(Continued)

(56) References Cited

U.S. PATENT DOCUMENTS 3,971,916 A * 7/1976 Moreno .............. G06F 12/1425
711/164
5,954,818 A * 9/1999 Dalvi .................. G06F 12/1466
711/163
(Continued)

FOREIGN PATENT DOCUMENTS

CN             101479850 A       7/2009

OTHER PUBLICATIONS

Arora, Secure Your Security Key in On-Chip SRAM: Techniques to Avoid Data Ramanance Attacks, http://www.design-reuse.com/articles/17660/on-chip-sram-data-remanance, Sep. 21, 2011, 4 pages.
(Continued)

*Primary Examiner* — Michael S McNally
(74) *Attorney, Agent, or Firm* — Foley & Lardner LLP

(57) ABSTRACT

A system for preventing data remanence in memory is provided. The system includes a computing device, a memory chip coupled to the computing device and including memory, and a heater, the heater configured to prevent data remanence in a memory by providing heat to at least a portion of the memory. The memory includes a plurality of bits configured to electronically store data.

33 Claims, 12 Drawing Sheets

Related U.S. Application Data continuation of application No. 14/274,232, filed on May 9, 2014, now Pat. No. 8,925,078, which is a continuation of application No. 13/850,472, filed on Mar. 26, 2013, now Pat. No. 8,763,148, which is a continuation of application No. 13/340,382, filed on Dec. 29, 2011, now Pat. No. 8,458,804.

(51) Int. Cl.

| | | |
|---|---|---|
| *G06F 21/00* | (2013.01) | |
| *G11C 5/00* | (2006.01) | |
| *G06F 21/60* | (2013.01) | |
| *G06F 21/62* | (2013.01) | |
| *G06F 21/79* | (2013.01) | |
| *G06F 3/06* | (2006.01) | |
| *H04L 9/08* | (2006.01) | |

(52) U.S. Cl.
CPC ............ *G06F 3/0673* (2013.01); *G06F 21/00* (2013.01); *G06F 21/60* (2013.01); *G06F 21/6218* (2013.01); *G06F 21/79* (2013.01); *G11C 5/005* (2013.01); *H04L 9/0822* (2013.01); *G06F 2212/1052* (2013.01); *G06F 2221/2143* (2013.01)

(58) Field of Classification Search
CPC ...... G06F 21/60; G06F 21/6218; G06F 21/79; G11C 5/005; H04L 9/0822
USPC ........................................................ 713/193
See application file for complete search history.

(56) References Cited

U.S. PATENT DOCUMENTS

| | | | | |
|---|---|---|---|---|
| 6,108,232 | A * | 8/2000 | Hennebois | G11C 7/1015 365/154 |
| 6,292,898 | B1 * | 9/2001 | Sutherland | G06F 21/87 713/193 |
| 6,407,545 | B1 | 6/2002 | Sato et al. | |
| 6,658,608 | B1 | 12/2003 | Kamp et al. | |
| 6,868,406 | B1 | 3/2005 | Ogg et al. | |
| 7,278,034 | B2 | 10/2007 | Shipton | |
| 7,302,592 | B2 | 11/2007 | Shipton et al. | |
| 7,346,783 | B1 | 3/2008 | Carrico et al. | |
| 7,461,268 | B2 | 12/2008 | Drehmel et al. | |
| 7,523,111 | B2 | 4/2009 | Walmsley | |
| 7,783,901 | B2 | 8/2010 | Carrico et al. | |
| 7,899,325 | B2 | 3/2011 | Dickson et al. | |
| 7,991,699 | B2 | 8/2011 | Walmsley | |
| 8,417,988 | B2 * | 4/2013 | Kim | G11C 29/82 711/103 |
| 8,572,315 | B2 * | 10/2013 | Kelkar | G11B 27/36 711/112 |
| 8,745,324 | B2 * | 6/2014 | Kelkar | G11B 27/36 711/112 |
| 8,885,429 | B1 | 11/2014 | Van Winkelhoff et al. | |
| 2003/0230770 | A1 | 12/2003 | Fricke et al. | |
| 2004/0260957 | A1 * | 12/2004 | Jeddeloh | G06F 1/206 713/300 |
| 2005/0152596 | A1 | 7/2005 | Walmsley | |
| 2005/0246529 | A1 | 11/2005 | Hunt et al. | |
| 2006/0015754 | A1 | 1/2006 | Drehmel et al. | |
| 2006/0023486 | A1 * | 2/2006 | Furusawa | G06F 21/79 365/145 |
| 2006/0059372 | A1 | 3/2006 | Fayar et al. | |
| 2006/0156008 | A1 | 7/2006 | Frank | |
| 2007/0056622 | A1 | 3/2007 | Leng et al. | |
| 2008/0012094 | A1 | 1/2008 | Ma et al. | |
| 2008/0034405 | A1 * | 2/2008 | McLean | G06F 12/1433 726/2 |
| 2008/0155278 | A1 | 6/2008 | Carrico et al. | |
| 2008/0175381 | A1 | 7/2008 | Drehmel et al. | |
| 2008/0310622 | A1 | 12/2008 | Drehmel et al. | |
| 2009/0126030 | A1 | 5/2009 | Walmsley | |
| 2009/0292901 | A1 | 11/2009 | Henry et al. | |
| 2009/0292904 | A1 | 11/2009 | Henry et al. | |
| 2010/0246235 | A1 | 9/2010 | Gouin | |
| 2010/0246811 | A1 * | 9/2010 | Sadler | H04L 9/3226 380/28 |
| 2010/0246817 | A1 * | 9/2010 | Sadler | H04L 9/0863 380/44 |
| 2010/0250602 | A1 * | 9/2010 | Sadler | G06F 21/6218 707/781 |
| 2010/0250968 | A1 * | 9/2010 | Sadler | G06F 21/554 713/193 |
| 2011/0019525 | A1 | 1/2011 | Guha et al. | |
| 2011/0265191 | A1 | 10/2011 | Russo et al. | |
| 2011/0289271 | A1 | 11/2011 | Nagpal et al. | |
| 2012/0167170 | A1 * | 6/2012 | Shi | G06F 21/32 726/2 |
| 2012/0274353 | A1 * | 11/2012 | Pedersen | G06F 21/76 326/40 |
| 2012/0291133 | A1 | 11/2012 | Nagpal et al. | |

OTHER PUBLICATIONS

Halderman et al., Lest We Remember: Cold Boot Attacks on Encryption Keys, http://citp.princeton.edu/research/memory, Jul. 2008, 2 pages.

International Search Report for Application No. PCT/US2012/71198, mail date Mar. 5, 2013, 2 pages.

Skorobogatov, Low Temperature Data Remanence in Static RAM, University of Cambridge Technical Report, Jun. 2002, 9 pages.

Supplementary European Search Report; European App. No. EP 12 86 2983; Mar. 14, 2016; pp. 1-5.

* cited by examiner

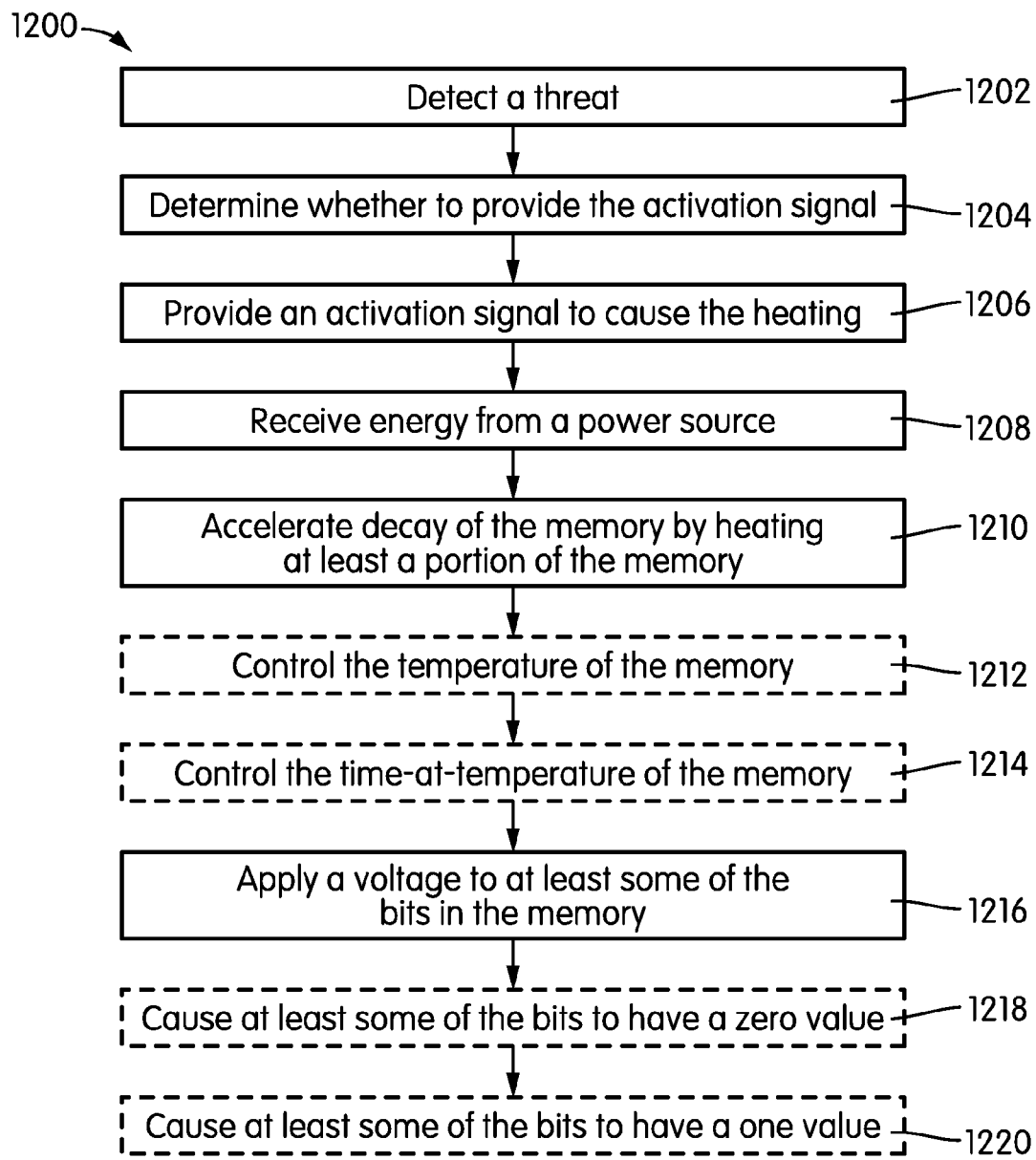

SYSTEMS AND METHODS FOR PREVENTING DATA REMANENCE IN MEMORY

CROSS-REFERENCE TO RELATED PATENT APPLICATIONS

This application is a continuation of application Ser. No. 14/584,974, filed Dec. 29, 2014, which is a continuation of application Ser. No. 14/274,232, filed May 9, 2014, now U.S. Pat. No. 8,925,078, issued Dec. 30, 2014, which is a continuation of application Ser. No. 13/850,472, filed Mar. 26, 2013, now U.S. Pat. No. 8,763,148, issued Jun. 24, 2014, which is a continuation of application Ser. No. 13/340,382, filed Dec. 29, 2011, now U.S. Pat. No. 8,458,804, issued Jun. 4, 2012, all of which are hereby incorporated by reference in their entireties.

BACKGROUND

The present disclosure relates generally to the field of memory for a computing device. More specifically, the present disclosure relates to the field of preventing data remanence in memory.

Hackers, corporate spies, and government agents may try to obtain sensitive information (e.g., encryption keys, trade secrets, government secrets, etc.) held by others and stored on computers. Proper software coding and safety precautions may make remote access of this information prohibitively difficult. However, direct physical access to the memory may allow an attacker to obtain such information. Thus, sensitive information is often stored in volatile memory so that it can be quickly erased or lost (i.e., evaporated, decayed, etc.) when power is removed from the memory. However, conventional volatile memory tends to retain data when the memory is cooled. For example, the decay rates in memory cooled to −50° C. may be sufficiently low that data stored in the memory without power can be recovered up to one year later. Thus, there is a need for improved systems and methods for preventing data remanence in a memory.

SUMMARY

One embodiment of the disclosure relates to a system for preventing data remanence in memory. The system includes a computing device, a memory chip coupled to the computing device and including memory, and a heater, the heater configured to prevent data remanence in a memory by providing heat to at least a portion of the memory. The memory includes a plurality of bits configured to electronically store data.

Another embodiment relates to a method for preventing data remanence in a memory in a computing device, the memory having a plurality of bits configured to electronically store data. The method includes heating at least some of the bits of the memory and causing accelerated decay of the bits of the memory in response to the heating.

Another embodiment relates to a method for use with a memory in a computing device, the memory having a plurality of bits configured to electronically store data. The method includes generating electrical energy based on a temperature difference, providing the electrical energy to a heater, heating at least some of the bits of the memory, and causing accelerated decay of the bits of the memory in response to the heating.

Another embodiment relates to a method for use with a memory in a computing device. The method includes generating a voltage based on a temperature difference, and reducing data remanence in the memory by applying the voltage to at least a portion of a memory.

Another embodiment relates to a method of protecting sensitive data stored in a memory in a computing device. The method includes determining remanence decay values for a plurality of memory sites within the memory, and storing data in one or more memory sites based on the remanence decay values of the memory site.

Another embodiment relates to a system for protecting sensitive data in a memory of a computing device. The system includes a memory chip including memory, the memory comprising a plurality of sites configured to electronically store data, and processing electronics configured to determine remanence decay values for the plurality of sites and to store data in one or more memory sites based on the remanence decay values of the memory site.

Another embodiment relates to a system for storing sensitive data. The system includes a memory chip coupled to a computing device and including memory. The memory includes a plurality of bits configured to electronically store data, and a portion of the memory is configured to have minimal increased data remanence upon cooling of the memory. The system further includes processing electronics configured to determine the sensitivity of a data and to store the data in the memory based on the sensitivity.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 11 is a flowchart of a process for use with a memory in a computing device, shown according to an exemplary embodiment.

FIG. 12 is a flowchart of a process for use with a memory in a computing device, shown according to another embodiment.

DETAILED DESCRIPTION

Figure 1:
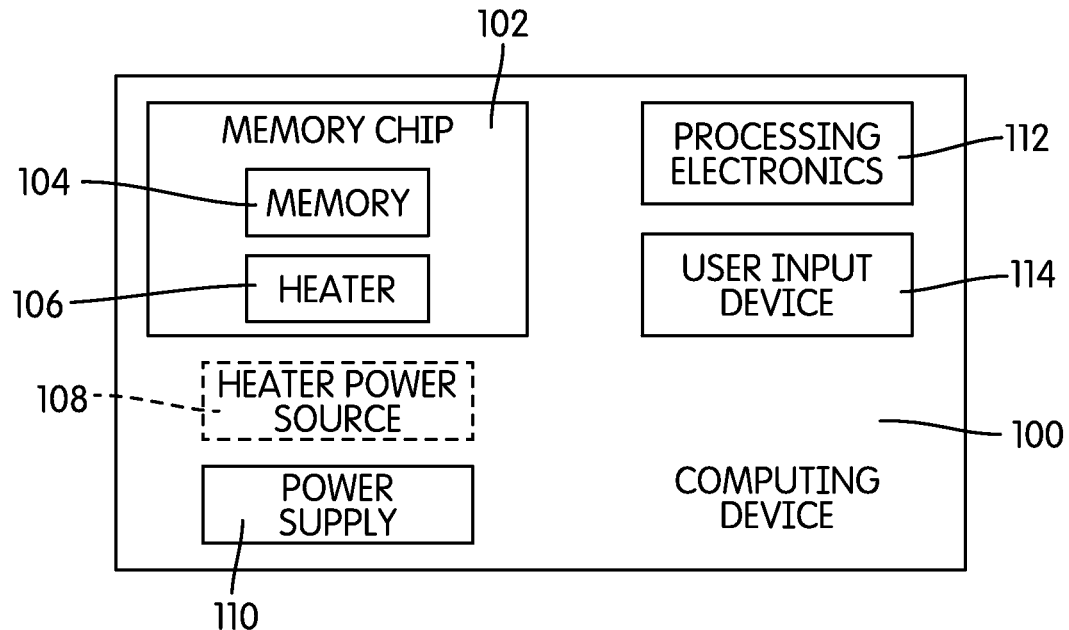
FIG. 1 is a schematic block diagram of a computing device, shown according to an exemplary embodiment.

Referring generally to the Figures, systems and methods for preventing (e.g., reducing, inhibiting, etc.) data remanence in a memory are shown and described. Sensitive information may be stored in a portion of a memory of a computing device (e.g., personal computer, server, portable communication devices, personal electronic device, etc.). The sensitive information may be, for example, encryption data, an encryption key, personal information, or any other type of data (e.g., data that may include corporate secrets, government secrets, and other similar types of sensitive data). Generally, the sensitive information is stored in volatile memory so that the information can be quickly erased if a threat is detected. Further, if power is removed from the memory to prevent erasure of the information, the information stored in the volatile memory is lost (e.g., erased, evaporated, decayed, etc.) due to the nature of volatile memory. However, for many memory families (e.g., MOS or CMOS), the colder the memory is, the more time it takes for the memory bits to decay. For example, at an operating temperature of approximately 50 degrees Celsius, significant decay occurs in seconds; whereas at −50 degrees Celsius, significant decay may take up to one year. Accordingly, in order to capture the information stored in the volatile memory, an attacker may use a cold boot attack, i.e., chill the memory (e.g., using liquid nitrogen, compressed air, etc.) to retain the information in the memory, then reboot the computing device using a kernel that can read the information stored in the memory. While each bit of memory may decay at a different rate after power is removed, one aspect of the invention ensures that a sufficient number of bits decay such that the information as a whole becomes unrecoverable. For example, with a 256-bit encryption key, even if only one-quarter of the bits decay, the attacker would still face 64 unknown bits, leaving 18 quintillion (18×10^18) possibilities. Thus, while an individual bit may retain its state, a statistically significant number of bits decay such that remanence of the data as a whole is prevented.

The memory and sensitive information may be configured to be erased or lost when a trigger condition is met. The condition may be generally based on a power status change or threat on the memory chip. Examples of when the condition is met include via user or software command, by a planned or unplanned power-down of the computer processing unit (CPU) or memory, and by a change in state of the CPU or operating system such as a locked, hibernate, or sleep state. Other examples of when the condition is met include via a threat detection, by a motion detection to determine if the CPU or memory is being physically moved, by location detection if the CPU or memory is being moved, by a change in stress, temperature, or applied fields associated with the CPU or memory, by the making or breaking of an electrical contact, etc.

In one embodiment, a heater may be used to prevent data remanence in a memory. The heater may be activated to provide heat when a trigger condition is met. By applying heat to the memory chip, the decay rates of memory bits are accelerated or decreased at a lesser rate, thereby improving the loss or evaporation of information stored in the memory. A cold attack typically occurs over a large area, i.e., it is a brute force attack chilling large portions of the computing device. However, the heater need only be configured to provide heat to a specific portion of a memory chip with the most sensitive data. Thus, while the computing device becomes quite cold, a relatively small heater may strategically thwart the cold attack by heating the relatively small mass of selected memory portions. Further, if the hacker attempts a more pinpoint cold attack on the memory chip of the computing device, the attack will likely take long enough such that the computing device may detect the impending attack, begin erasing data stored on the memory, and heat the memory chip to accelerate decay and inhibit cooling.

In another embodiment, the remanence decay rates or times of the memory chip may be characterized, and the remanence decay times or rates may be used to help prevent data remanence in a memory. Remanence decay times or rates for various memory sites within the memory chip may be determined, and sensitive data may be stored in the memory sites in which the decay times are the shortest or decay rates are the fastest. Thus, the sensitive data is among the first data to decay from the memory chip when a trigger condition is met.

In another embodiment, when data remains in a portion of the memory for a significant period of time, the memory bits may be "burned in" to the memory chip such that the decay rates of decay rates are reduced even at elevated temperatures. The software of the computing device may be configured to change which memory bits of the memory chip are used to store sensitive data in order to avoid "burning in" the data in the memory chip.

In another embodiment, portions of the memory may be configured to have a minimal increase in data remanence upon cooling compared to when there is a "normal" temperature. For example, the construction of the bits themselves may be impervious or less affected by lower temperatures (e.g., a cold attack). Since cooling of a memory chip may increase the remanence time of the memory chip (i.e., increasing the amount of time that sensitive data remains on the memory chip after power is removed from the chip), part of the memory may be configured to have a minimal lifetime increase upon cooling, and that part of the memory may store the sensitive data.

For purposes of this disclosure, the term "coupled" means the joining of two members directly or indirectly to one another. Such joining may be stationary in nature or moveable in nature and such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring now to FIG. 1, a block diagram of a computing device 100 for use with the systems and methods of the present disclosure is shown according to an exemplary embodiment. The computing device 100 may be a personal computer (PC), server, portable communication device, or any other type of electronic device configured to store data in a memory. The computing device 100 is shown to include a memory chip 102, which includes a memory 104 (e.g., a memory circuit) and a heater 106. The computing device 100 further includes a power supply 110 configured to provide power for the computing device 100. The power supply may be a mains power supply (e.g., a utility power supply), an uninterruptible power supply, a generator, or any other suitable type of power supply. The computing device further includes processing electronics 112 and a user input device 114 (e.g., a keyboard, keypad, touchscreen, trackball, button, knob, mouse, etc.).

The memory 104 may be configured to electronically store data. According to an exemplary embodiment, the memory 104 includes a plurality of bits that may be configured to store data as a plurality of ones and zeroes. According to another embodiment, the memory 104 has a memory state. The memory state may be selectively changed and configured to store data therein. At least some of the data may be any type of sensitive data (e.g., encryption data, an encryption key, encrypted data, or unencrypted data). According to the exemplary embodiment shown, the memory 104 is a volatile memory, which may be, for example, static random access memory (SRAM) or dynamic random access memory (DRAM).

The data in memory 104 is configured to be erased or lost during specific events (e.g., if the memory chip is being removed or tampered with, if the computing device 100 is being powered down, other trigger conditions, etc.). The heater 106 of the memory chip 102 is configured to prevent remanence of the data in the memory 104 by providing heat to the memory chip 102. Generally, the warmer the memory 104, the faster the bits of memory decay. Similarly, the warmer the memory 104, the faster the memory state decays. For example, the heater 106 may inhibit cooling of the memory chip 102 in the event of a cold attack. Applying heat to the memory 104 may accelerate the decay rate, shorten the decay time, or otherwise speed up the loss of the data stored therein. In the case of a cold attack, the heat reduces the deceleration of decay caused by the cold. According to various exemplary embodiments, the heater 106 may be configured to heat the whole memory chip 102, to heat a portion of the memory chip 102, to heat the whole memory 104, or to heat a portion of the memory 104.

Figure 2:
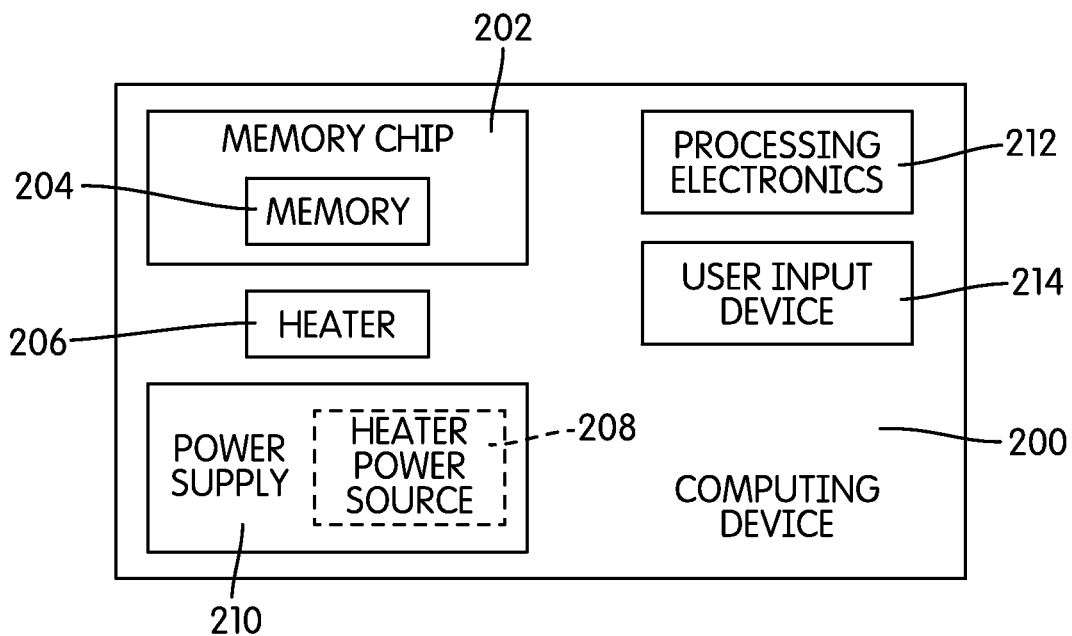
FIG. 2 is a schematic block diagram of a computing device, shown according to another embodiment.

The heater 106 of FIG. 1 is shown as disposed on the memory chip 102. Referring briefly to FIG. 2, the heater 206 may not be a part of the memory chip 202, but instead may be located elsewhere on the computing device 200 (e.g., disposed proximate the memory chip 202). The heater 106 may be located either on the memory chip 102 or elsewhere on the computing device 100, and the heater 106 is configured to heat the memory chip 102 regardless of the actual physical location of the heater 106.

According to one exemplary embodiment, the heater 106 may be powered by the power supply 110. According to other embodiments, the computing device 100 may further include a heater power source 108. The heater power source 108 is a power source configured to provide power to the heater 106. As shown, the heater 106 is powered by a power source independent from the power supply 110. In various embodiments, the heater power source 108 may be a battery, capacitor, thermoelectric generator, photovoltaic cell, or other type of power source. Having an independent power source 108 prevents an attacker from simply unplugging the computing device to circumvent the heating mechanism. Referring briefly to FIG. 2, the heater power source 208 is shown as a part of the power supply 210 instead of independent from the power supply 210. In yet another embodiment, the heater power source 108 may be external from the computing device 100. The heater power source 108, 208 may be a battery or capacitor that is recharged by the power supply 110, 210.

The heater 106 may be any type of heater that is capable of heating up all of or a portion of the memory chip 102, or all or a portion of memory 104. In one embodiment, the heater 106 is a resistive heater. In another embodiment, the heater 106 is an optical heater. In yet another embodiment, the heater 106 is an infrared heater. In yet another embodiment, the heater 106 is a thermoelectric heater. According to another embodiment, the heater 106 is an inductive heater.

In yet another embodiment, the heater 106 is a chemical heater. For example, the heater 106 includes a reactive multi-layer foil material (e.g., a "nanofoil"), in which layers of reactive materials may be sandwiched together to create the multi-layer foil material, and activation energy is provided to begin the chemical reaction. The activation energy may be provided in response to a trigger condition as generally described in the present disclosure. Each layer may be very thin (e.g., between 0.01 and 100 microns thick).

The heater 106 is configured to actively heat the memory 104. The heater 106 is not an ambient heat in the computing device 100, is not heat generated by current through the data storage circuits of the memory 104, nor heat generated by current through the processing electronics 112.

Figure 3:
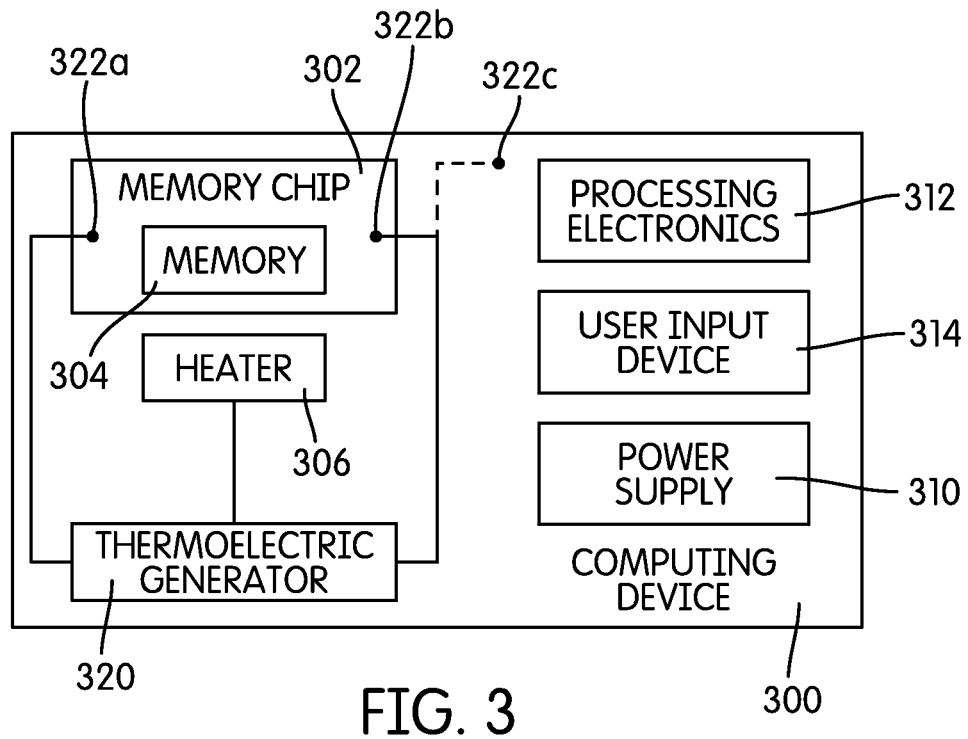
FIG. 3 is a schematic block diagram of a computing device, shown according to another embodiment.

Referring now to FIG. 3, a computing device 300 is shown according to an exemplary embodiment. The computing device 300 is shown to include a thermoelectric generator 320. The thermoelectric generator 320 is configured to generate electrical energy based on a temperature difference. In the embodiment of FIG. 3, the thermoelectric generator 320 includes a plurality of thermoelectric junctions 322 (e.g., bimetallic junctions, doped semiconductor junctions, etc.), shown as a first thermoelectric junction 322a and a second thermoelectric junction 322b located on the memory chip 302. When a temperature difference is created between the first and second thermoelectric junctions 322a, 322b, (e.g., across the memory chip 302 during a cold attack) electricity is generated in the thermoelectric generator 320. Power from the thermoelectric generator 320 is then provided to the heater 306, which then provides heat to the memory 304. According to other embodiments, one or more thermoelectric junctions 322c located elsewhere in the computing device 300 may be used instead of or in addition to one or both of the first and second thermoelectric junctions 322a, 322b. According to one embodiment, one junction 322 is located on a different portion of the computing device 300. According to another embodiment, neither junction 322 is located on the memory chip 302. According to yet another embodiment, a plurality of junctions 322 are distributed over memory chip 302. For example, one or more layers of a circuit board of the memory chip 302 may be doped so as to cause a Seebeck effect response. According to yet another embodiment, a plurality of junctions are distributed over a region of the computing device 300. Other embodiments of the thermoelectric generator 320 may use non-metallic materials or junctions (e.g., doped semiconductors, etc.). While thermoelectric generators tend to be inefficient, the large area and change in temperature of the cold attack versus the small area and mass of the memory to be heated indicates that sufficient power will be generated to thwart the attack. Further, the thermoelectric generator 320 may be configured such that the gradual and even heating that occurs during normal operation of the computing device will not generate enough electricity to cause detrimental heating by the heater 306.

Figure 4:
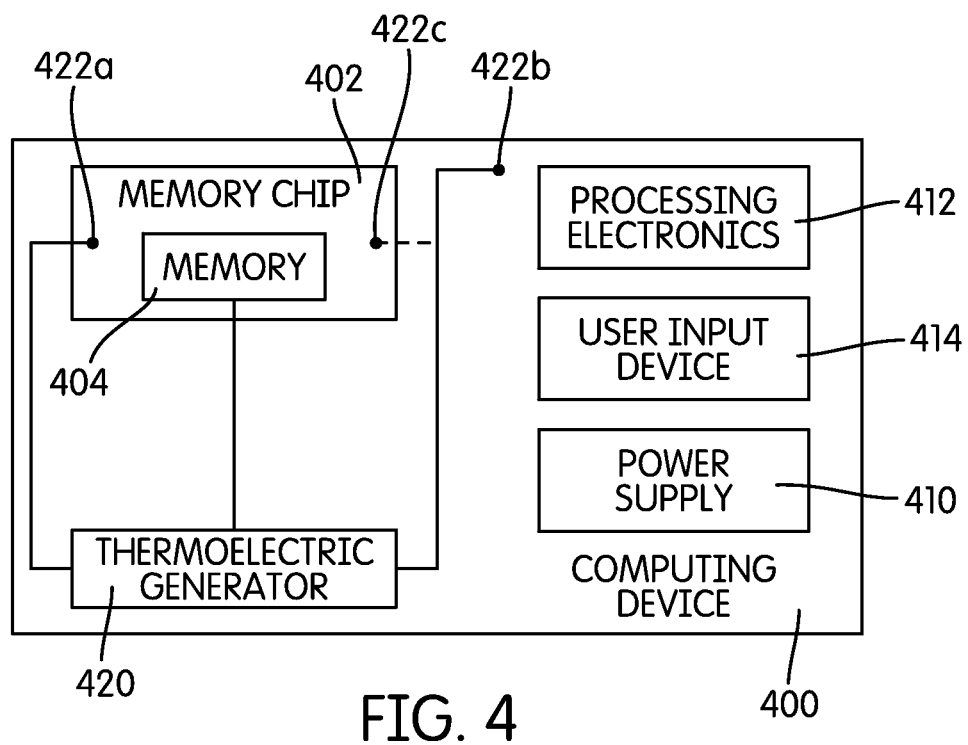
FIG. 4 is a schematic block diagram of a computing device, shown according to another embodiment.

Referring now to FIG. 4, the thermoelectric generator 420 is electronically coupled to the memory 404 and may be configured to provide a low voltage to at least some of the bits in the memory 404, to provide a high voltage to at least some of the bits of the memory 404, to zero at least some of the bits of their memory 404, or to set at least some of the bits of the memory 404 to one. Accordingly, the thermoelectric generator 420 is configured to begin erasing or overwriting data stored in memory 404 in response to a change in temperature across a portion of the computing device 400 (e.g., a sudden change in temperature, a cold attack, etc.). According to one embodiment, the thermoelectric generator 420 may cause at pattern (e.g., a random, pseudo random, or non-random distribution) of ones and zeroes. According to another embodiment, the thermoelectric generator 420 is configured to begin operating on the bits of memory 404 that contain sensitive data first. According to yet another embodiment, the thermoelectric generator 420 may be configured to first erase the bits of memory 404 that contain memory pointers.

According to the embodiment shown, the thermoelectric generator 420 is configured to use a temperature difference between two portions (e.g., a first location 422a and a second location 422b) of the computing device 400. Whereas the embodiment of FIG. 3 detects a temperature change (and possible attack) across the memory chip 302, the embodiment of FIG. 4 detects a temperature change (and possible attack) across the entire computing device 400. However, the thermoelectric generator 420 may use a location 422c located on the memory chip 402 and thereby use a temperature change across the memory chip 402.

Referring generally to FIGS. 5-8, various exemplary embodiments are shown of a system for controlling heat from a heater 506, 606, 706, 806 to the memory 504, 604, 704, 804. The system may control the temperature of a memory 504, 604, 704, 804 or an environment surrounding a computing device to maintain a specified temperature value. For example, a desired temperature for the memory or the environment around the memory may exist, and when the temperature decreases beyond a pre-set threshold, the heater is then triggered. In various embodiments, the specified maintained temperature may be 20 degrees Celsius, 40 degrees Celsius, 50 degrees Celsius, greater than 20 degrees Celsius, greater than 40 degrees Celsius, greater than 50 degrees Celsius, or another temperature. The system may be configured to maintain a time-at-temperature value. For example, the system may be configured to maintain the temperature of the memory 504, 604, 704, 804, at 50 degrees (or greater) Celsius for 10 seconds. This "time at temperature" may provide sufficient time and temperature for the memory bits to decay. According to another embodiment, the system may be configured to maintain a temperature of 40 degrees (or greater) Celsius for at least one minute. The system may be configured such that the time maintained may be a function of the temperature maintained. For example, if the system can maintain a temperature of 50 degrees Celsius, it may only need to provide heat for 10 seconds to allow memory decay of a sufficient number of bits that the contents of the memory are nonsensical, unrecoverable or irretrievable. If, however, the system can only maintain a lower temperature (e.g., 45 degrees Celsius, 35 degrees Celsius, etc.), then the system may maintain that temperature for a longer period of time in order to generate sufficient decay to render the data unrecoverable. The length of time may be based on statistical rates of decay for bits at various temperatures.

The system may control the heat provided by a mechanical or electronic thermostat, a temperature controller in conjunction with a temperature sensor (e.g., thermocouple, thermostat, etc.), or another device configured to respond to temperature or heat, to measure a temperature, or to receive a temperature reading from a remote source. The system is used to trigger the heater to accelerate data decay in the memory by raising the temperature and/or maintaining a temperature in the computing device in order to resist or inhibit cooling.

Figure 5:
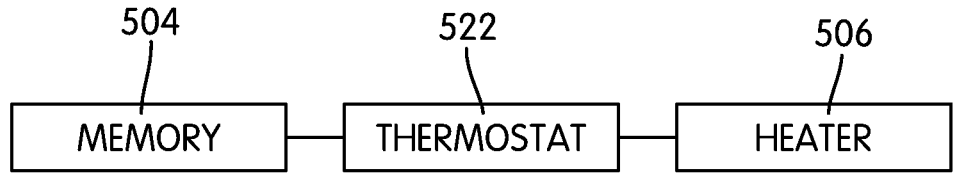
FIG. 5 is a schematic block diagram of a system for controlling heat from a heater to a memory, shown according to an exemplary embodiment.

Referring to FIG. 5, a thermostat 522 is connected to a heater 506. The thermostat 522 of FIG. 5 is a device configured to regulate the temperature of the memory 504 such that the temperature of the memory 504 is maintained near a desired point (e.g., set point, specified temperature, etc.). When the thermostat 522 measures a current temperature that is not within a threshold, the thermostat 522 may permit heat from the heater 506 to pass to the memory 504. For example, according to one embodiment, the thermostat 522 may include a bimetallic strip that is coupled at one end to the memory 504 and that is configured to conduct heat from the heater 506 to the memory 504. When the temperature of the memory 504 is above a threshold, the bimetallic strip does not contact the heater 506. However, when the temperature of the memory 504 is below the threshold, the bimetallic strip deflects such that the strip contacts the heater 506 and creates a conductive path for heat from the heater 506 to the memory 504.

Figure 6:
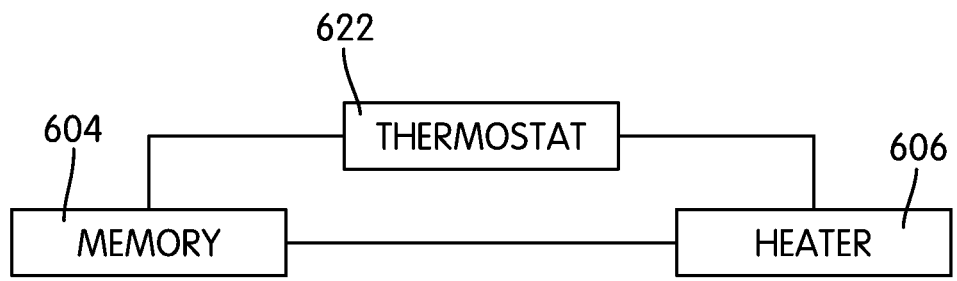
FIG. 6 is a schematic block diagram of a system for controlling heat from a heater to a memory, shown according to another embodiment.

In the embodiment of FIG. 5, the thermostat 522 is configured to control the flow of heat from the heater 506 to the memory 504. Accordingly, the heater 506 may be always on or open-loop controlled. In the embodiment of FIG. 6, the thermostat 622 is configured to control the heater 606 in response to the temperature of the memory 604. For example, the thermostat 622 may be configured to close a circuit between a heater power source and the heater 606 in response to the temperature of the memory 604 falling below a threshold. Accordingly, the heater 606 may be closed-loop controlled.

Figure 7:
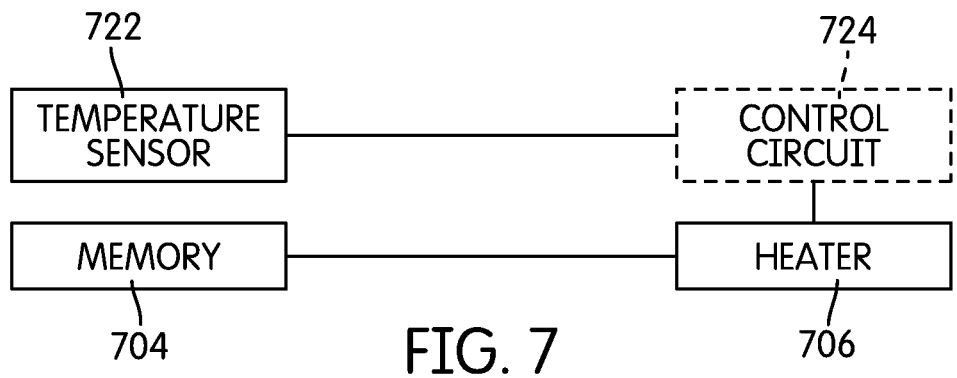
FIG. 7 is a schematic block diagram of a system for controlling heat from a heater to a memory, shown according to another embodiment.

Referring now to FIG. 7, a temperature sensor 722 is connected to a control circuit 724. The temperature sensor 722 provides an input to the control circuit 724 indicative of the current temperature of the memory 704 or in the environment around the memory 704. The temperature sensor 722 may measure the temperature across a memory chip, across the entire computing device, or across any part of the computing device. The control circuit 724 receives the input from the temperature sensor 722 and uses the input to determine if a change in temperature has occurred. If there is a change in temperature exceeding a threshold, the control circuit 724 may then be configured to activate the heater 706. The control circuit 724 may receive an input and compare it to a threshold, according to one embodiment. The control circuit 724 may receive multiple inputs and compare the inputs to each other and to a threshold to determine whether to activate the heater 706, according to another embodiment.

Figure 8:
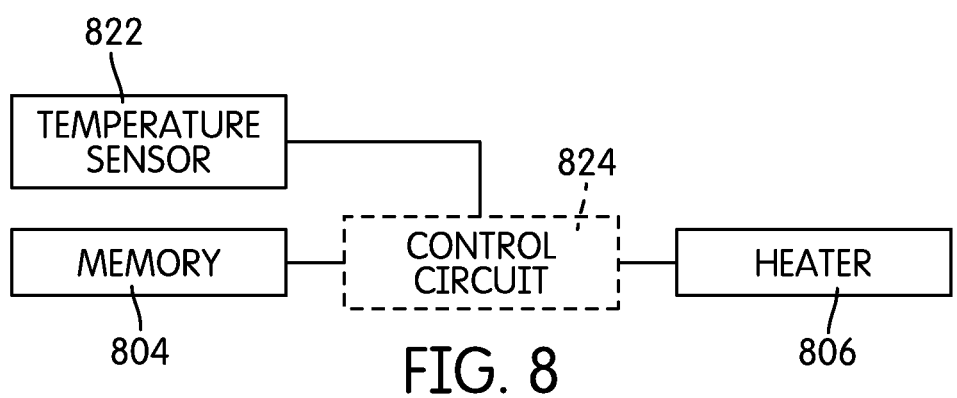
FIG. 8 is a schematic block diagram of a system for controlling heat from a heater to a memory, shown according to another embodiment.

In the embodiment of FIG. 7, the control circuit 724 is coupled to the heater 706 and is configured to provide closed-loop control of the operation of the heater 706. Referring now to FIG. 8, the control circuit 824 is thermally coupled between heater 806 and memory 804 and is configured to control the flow of heat from the heater 806 to the memory 804. For example, according to one embodiment, the control circuit 824 opens and closes a switch along a conductive path between the heater 806 and the memory 804. Thus, while the heater 806 may be always on or open-loop controlled, the amount of heat that is transferred from the heater 806 to the memory 804 may be closed-loop controlled.

While the embodiments of FIGS. 5-8 are described as triggering the heating of the memory, these systems may instead or further be configured to decouple heat from the memory, for example, to prevent overheating of the memory 504, 604, 704, 804. According to various embodiments, the thermostat 522, 622 or control circuit 722, 822 may be configured to cause heating of the memory 504, 604, 704, 804 when the temperature of the memory is below a first threshold value, and to inhibit heating of the memory 504, 604, 704, 804 when the temperature of the memory is above a second threshold value.

Figure 9:
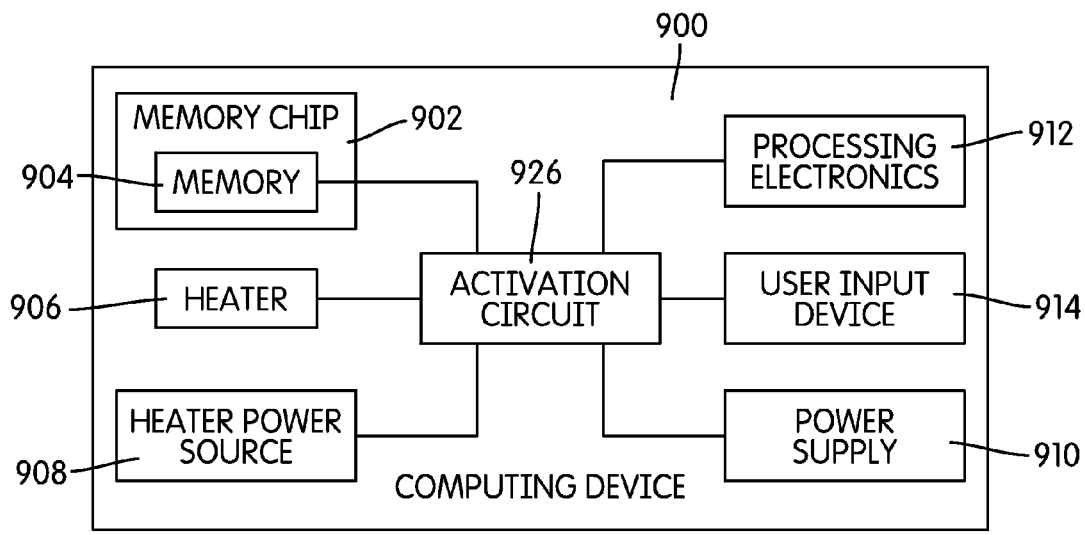
FIG. 9 is a schematic block diagram of a computing device, shown according to another embodiment.

Referring now to FIG. 9, a computing device 900 is shown according to another exemplary embodiment. The computing device 900 includes an activation circuit 926. According to one embodiment, the activation circuit 926 is configured to cause the heater 906 to provide heat in response to a trigger condition by providing an activation signal to the heater 906 or the heater power source 908. The heat from the heater 906 is then used to prevent data remanence on the memory 904. That is, the heat may be used to accelerate decay of the data stored in the memory 904. According to other embodiments, the activation circuit 926 may be configured to cause at least some of the bits in the memory 904 to have a zero value or a one value. The changing of the values of bits may occur by applying a high or low voltage to the bits. The activation circuit 926 may be connected to any number of other computing device 900 components, including processing electronics 912, the user input device 914, and the power supply 910, and may provide instructions to any computing device 900 component to affect the operation of the heater 906 or computing device 900 in reaction to the trigger condition. According to one embodiment, the activation circuit 926 may cause the processing electronics 912 to command or otherwise cause the erasure of the date stored in the memory 904. The activation circuit 926 may be mechanical (e.g., a thermostat as described in FIGS. 5-6), may be processing electronics, may be solid-state electronics, may be a switch or other mechanical or electrical components.

The activation signal may be sent based on any number of events or trigger conditions. In one embodiment, the trigger condition may be a user command to erase the data in the memory 904. In another embodiment, the trigger condition may be a software command to erase the memory based on software configuration. In another embodiment, the trigger condition may be a planned power-down of the memory 904 or computing device 900. In another embodiment, the trigger condition may be an unplanned power-down of the memory 904 or computing device 900. In another embodiment, the trigger condition may be a change in state of the computing device. The change in state may be when the computing device enters a locked state, a sleep state, or a hibernation state, etc.

In one embodiment, the trigger condition is a threat detection. The threat detection may occur in response to a power signal. For example, the power signal may indicate when a power supply to the computing device is cut off or otherwise changed.

The threat detection may occur in response to an accelerometer signal. The accelerometer signal may be a signal representing physical movement of the memory chip 902 or computing device 900, or may be a signal representing relative motion of the memory chip 902 and computing device 900 (e.g., if the memory chip 902 and computing device 900 are moving in opposing directions). For example, if an attacker is manually trying to move the computing device 900 or remove the memory chip 902 from the computing device 900, the accelerometer signal may indicate such activity. The accelerometer may further detect motion of a portion of the computing device 900. For example, if movement of a lid, cover, or memory enclosure is detected, the accelerometer signal indicates a threat exists.

The threat detection may occur in response to a location signal. The location signal may be provided by a global positioning system (GPS), cellular network signal, or other signal or system. For example, if the computing device 900 is a portable device, a GPS may be used to determine the location of the computing device 900 at all times. When the computing device 900 is located outside of a pre-determined bound for the location of the computing device 900, it may be determined that the computing device 900 was stolen or otherwise moved, and a threat is therefore detected. As another example, the computing device 900 may be a cell phone and the cellular network signal may be used to determine if the computing device 900 is located outside of a pre-determined bound. The pre-determined bound may simply be an area or location in which the computing device 900 should always be located within.

The threat detection may occur in response to a stress signal or strain signal. For example, a physical attack on a memory chip 902 or computing device 900 may be detected via a stress or strain gauge. If pressure or force is exerted on the memory chip 902 or computing device 900 beyond a normal or expected level, a stress signal or strain signal may be used to indicate a current threat.

The threat detection may occur in response to a temperature signal (e.g., if the temperature of a portion of the computing device 900 or the environment surrounding the computing device 900 changes). The temperature signal may be caused by a thermostat, thermistor, thermocouple, thermometer, temperature sensor, or other device for measuring, detecting, or responding to a temperature.

The threat detection may occur in response to an applied field signal. If a magnetic, inductive, or capacitive field is generated, disruption of the field may cause an applied field signal that indicates a current threat. According to one embodiment, a field may be established between a lid or cover of the computing device 900 or a memory enclosure and another portion of the computing device 900. Subsequent removal or tampering with the lid or cover may disrupt the field, thereby causing an applied field signal. According to another embodiment, the applied field may be established between the memory chip 902 and another portion of the computing device 900.

The threat detection may occur in response to the making or breaking of an electrical contact. For example, the activation circuit 926 may be a switch that is closed when a cover is opened or removed from the computing device 900. According to another embodiment, the activation circuit 926 may include an electrical contact that is broken when a lid, cover, or memory enclosure is removed from the computing device 900.

Figure 10:
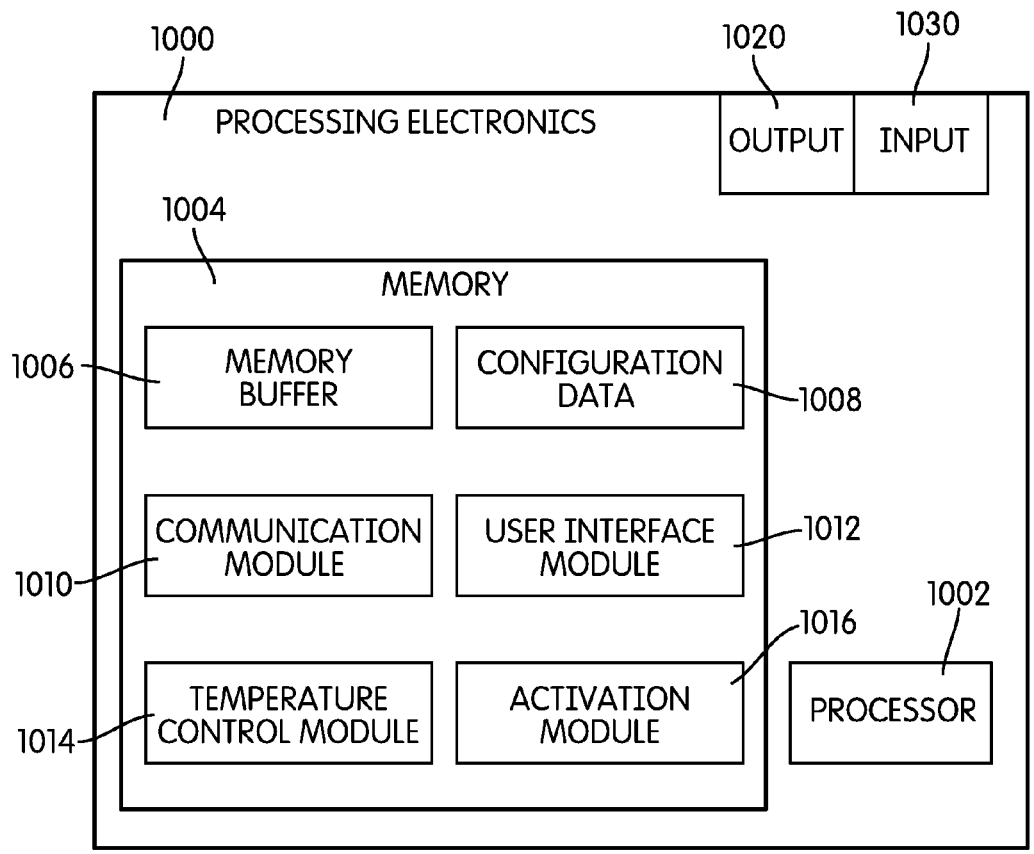
FIG. 10 is a detailed block diagram of the processing electronics of FIGS. 1-4 and 9, shown according to an exemplary embodiment.

Referring now to FIG. 10, a block diagram of processing electronics 1000 configured to execute the systems and methods of the present disclosure is shown, according to an exemplary embodiment. The processing electronics 1000 may be similar to the processing electronics of FIGS. 1-4 and 9 (e.g., processing electronics 112, 212, 312, 412 or 912). The processing electronics 1000 as shown may be part of a computing device as described in the present disclosure.

The processing electronics 1000 includes a processor 1002 and memory 1004. The processor 1002 may be implemented as a general purpose processor, an application specific integrated circuit (ASIC), one or more field programmable gate arrays (FPGAs), a group of processing components, or other suitable electronic processing components. The memory 1004 is one or more devices (e.g., RAM, ROM, Flash memory, hard disk storage, etc.) for storing data and/or computer code for completing and/or facilitating the various processes described herein. The memory 1004 may be or include non-transient volatile memory or non-volatile memory. According to various embodiments, the memory 1004 may be or include the memory 104, 204, 304, 404, 504, 604, 704, 804, or 904 of the computing device 100, 200, 300, 400, 500, 600, 700, 800 or 900. The memory 1004 may include data base components, object code components, script components, or any other type of information structure for supporting the various activities and information structures described herein. The memory 1004 may be communicably connected to the processor 1002 and includes computer code or instructions for executing one or more processes described herein.

The memory 1004 includes a memory buffer 1006. The memory buffer 1006 is configured to receive data via an input 1030. The data may include data from a temperature sensor or temperature controller, data from an activation circuit relating to a trigger condition, or other data that may be used to determine whether a heater should or should not be activated.

The memory 1004 further includes configuration data 1008. The configuration data 1008 includes data relating to the processing electronics 1000 or to various controllers or temperature sensors. For example, the configuration data 1008 may include information relating to a retrieval process of data from a temperature sensor or controller, from an activation circuit or control circuit, or otherwise. The configuration data may include transfer functions for thermocouples, strain gauges, etc.

The memory 1004 further includes a communication module 1010. The communication module 1010 is configured to provide communication capability with other components of the computing device via the output 1020. For example, the communication module 1010 may be configured to provide a command to a heater to begin heating a memory chip in response to a determination by a module 1014, 1016.

The memory 1004 further includes a user interface module 1012. The user interface module 1012 is configured to receive a user input from the input 1030 and to interpret the input for the other modules of the processing electronics 1000. For example, the user interface module 1012 may receive a user request to erase sensitive data on a memory chip and may be configured to provide a command to a heater or heater power source via the output 1020 to begin heating the memory chip.

The memory 1004 is shown to include modules 1014-1016 for executing the systems and methods described herein. The temperature control module 1014 may receive a temperature input via the input 1030 and use the temperature input to determine whether a heater should activate to erase data on a memory chip. Such a determination may be made by the temperature control module 1014 by comparing the temperature input to a desired temperature and to other temperature data. For example, if the temperature is below a given threshold, the temperature control module 1014 may send a command to a heater or heater power source via the output 1020 to begin heating. As another example, if a sudden change in temperature is detected based on the temperature input and previous temperature data, the temperature control module 1014 may send a command to a heater via the output 1020 to begin heating. It should be understood that the temperature control module 1014 may be remotely located from the processing electronics 1000 in various embodiments and may still perform the functionality described herein. The temperature control module 1014 may also be configured to control the temperature of the computing device. For example, the temperature control module 1014 may receive signals from or provide commands to the control circuits 724, 824 or the embodiments of FIGS. 7 and 8.

The memory 1004 is shown to include an activation module 1016. The activation module 1016 may receive an input relating to a possible trigger condition or threat to the computing device or memory chip, and may determine if a heater of the computing device should be activated to accelerate decay of memory bits on the memory chip. The input may be provided by, for example, an activation circuit of the computing device (e.g., activation circuit 926 of FIG. 9). The input may relate to a potential trigger condition or threat to the computing device.

In one embodiment, the activation module 1016 receives a user command from the input 1030 or a software command from another component of the processing electronics 1000, and provides a signal to activate a heater to an activation circuit remotely located from the processing electronics 1000. In another embodiment, the activation module 1016 may receive an indication that the computing device or memory chip is powering down and provides a signal to activate a heater in response to the power status change. In another embodiment, the activation module may receive an indication that a state of the computing device (e.g., sleep state, hibernation state, locked state, etc.) is beginning or ending and, in response, provides a signal to activate or deactivate a heater. In another embodiment, a threat detection may be provided to the activation module 1016 (e.g., via the activation circuit 926 of FIG. 9) and the activation module 1016 may determine whether or not the threat is legitimate, for example, by comparing the detected threat to other data, signals, inputs or thresholds.

The processing electronics 1000 further includes an output 1020 and input 1030. The output 1020 is configured to provide an output to any component of the computing device as described above. Outputs may include, for example, a command to initiate heating of a memory chip and a command to erase the data stored in a memory. The input 1030 is configured to data from the various components of the computing device as described above.

Referring generally to FIGS. 11-16, various processes for preventing or reducing data remanence in a memory of a computing device are shown. The processes of FIGS. 11-16 may be implemented by the various systems described in FIGS. 1-10. The data in the memory may be encryption data, an encryption key, or other encrypted or unencrypted data. The memory may be volatile memory and may include SRAM or DRAM. The computing device may be a personal computer, server, portable communication device, personal electronic device, or another electronic device.

The heater as described in FIGS. 11-14 is configured to provide active heating instead of providing heating via residual heat from current through the data storage circuits of the memory, processing electronics of the computing device, or ambient heat in the computing device. The heater may be a resistive heater, optical heater, infrared heater, thermoelectric heater, or chemical heater.

Referring to FIG. 11, a flow diagram of a process 1100 for use with a memory in a computing device is shown, according to an exemplary embodiment. The process 1100 includes accelerating decay of a memory of a computing device by heating at least a portion of the memory (step 1102). The heating of the memory may include activating a heater, and allowing the heat to accelerate the decay of memory bits on the memory chip of the computing device. According to one embodiment, the memory includes a plurality of bits configured to electronically store data, and the process includes the steps of heating at least some of the bits of the memory and causing accelerated decay of the bits of the memory in response to the heating.

Referring to FIG. 12, a flow diagram of a process 1200 for use with a memory in a computing device is shown, according to another exemplary embodiment. The process 1200 includes detecting a threat (step 1202). The threat may detected by an activation module or activation circuit, according to an exemplary embodiment. The activation module may receive an input from an activation circuit relating to a trigger condition as described in FIGS. 9-10.

The process 1200 further includes determining whether to provide an activation signal (step 1204) that would, for example, activate a heater of the computing device. The threat detection of step 1202 may be used to determine if activation of the heater is needed. For example, a location signal may be received and used in step 1204 to determine if the current location of the computing device represents a threat. As another example, a sudden change in temperature may be used in step 1204 to determine if a hacker is attempting a cooling attack on the memory chip of the computing device. Various other types of threats may be detected and used in step 1204 as described in FIGS. 9-10.

The process 1200 further includes providing an activation signal to cause the heating (step 1206). The activation signal may be provided directly to the heater, to a heater power source, to a control circuit coupled to the heater, or otherwise. The process 1200 further includes receiving energy from a power source (step 1208). The power source may be a power supply of the computing device, a heater power source configured specifically to provide a power source to the heater, a power source external to the computing device, or otherwise. The power source may be a battery, capacitor, thermoelectric generator, photovoltaic cell, etc.

The process 1200 further includes accelerating decay of the memory by heating at least a portion of the memory (step 1210). The heating can inhibit cooling of the memory (in the case where the memory chip is being cooled) or raise the temperature of the memory chip. The heating may be provided by a resistive heater, optical heater, infrared heater, thermoelectric heater, chemical heater, or any other type of heater. The heater may be coupled to the memory chip including the memory or be spaced apart from the memory chip including the memory. The heater may heat a portion or the entire memory chip.

The process 1200 may further include controlling the temperature of the memory (step 1212). For example, if the memory is currently under a cooling attack, the temperature of the memory may be controlled such that a cooling of the memory is prevented or delayed. Step 1212 may include receiving at a temperature control circuit a temperature signal indicative of the current temperature and providing enough heat to increase the current temperature to a desired temperature (e.g., 20 degrees Celsius, 40 degrees Celsius, between 40 and 50 degrees Celsius, etc.).

The process 1200 may further include controlling the time-at-temperature of the memory (step 1214). For example, a desired temperature of the memory or the environment around the memory may be maintained for a prescribed time. In various embodiments, the temperature to maintain may be 20 degrees Celsius, greater than 20 degrees Celsius, 40 degrees Celsius, greater than 40 degrees Celsius, 50 degrees Celsius, greater than 50 degrees Celsius, or another temperature.

The process 1200 further includes applying a voltage to at least some of the bits in the memory (step 1216). The process 1200 may further include causing at least some of the bits to have a zero value (step 1218) or a one value (step 1220) in response to applying the voltage to the bits in the memory. Steps 1218, 1220 may be implemented as a way to erase the data in the memory by changing all or a significant number of bits to a zero or one, thereby rendering the data useless, unrecoverable, or corrupted.

Figure 13:
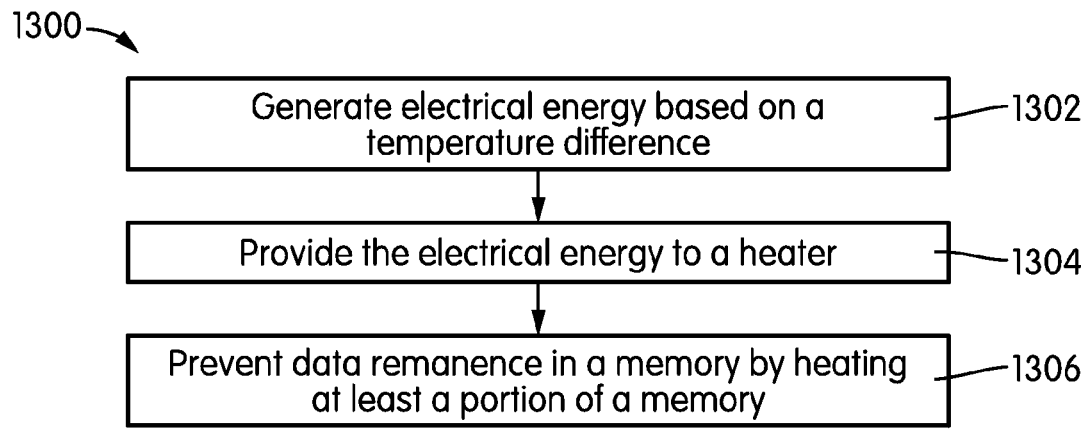
FIG. 13 is a flowchart of a process for use with a memory in a computing device, shown according to another embodiment.

Referring now to FIG. 13, a flow diagram of a process 1300 for use with a memory in a computing device is shown, according to another exemplary embodiment. The process 1300 uses a temperature difference to provide energy to a heater to erase the data in a memory chip. The process 1300 may be implemented using a thermoelectric generator as described in FIGS. 3-4. The process 1300 includes generating electrical energy based on a temperature difference (step 1302). For example, the temperature difference may be a temperature difference across the memory. The energy may be generated by a thermoelectric generator. The process 1300 further includes providing the electrical energy to a heater (step 1304) and preventing data remanence in the memory by heating at least a portion of the memory (step 1306). The heater provides heat to the memory which prevents or reduces data remanence by accelerating (e.g., inhibiting deceleration) of decay of memory bits. According to one embodiment, the memory includes a plurality of bits configured to electronically store data, and the process includes the steps of heating at least some of the bits of the memory and causing accelerated decay of the bits of the memory in response to the heating.

Figure 14:
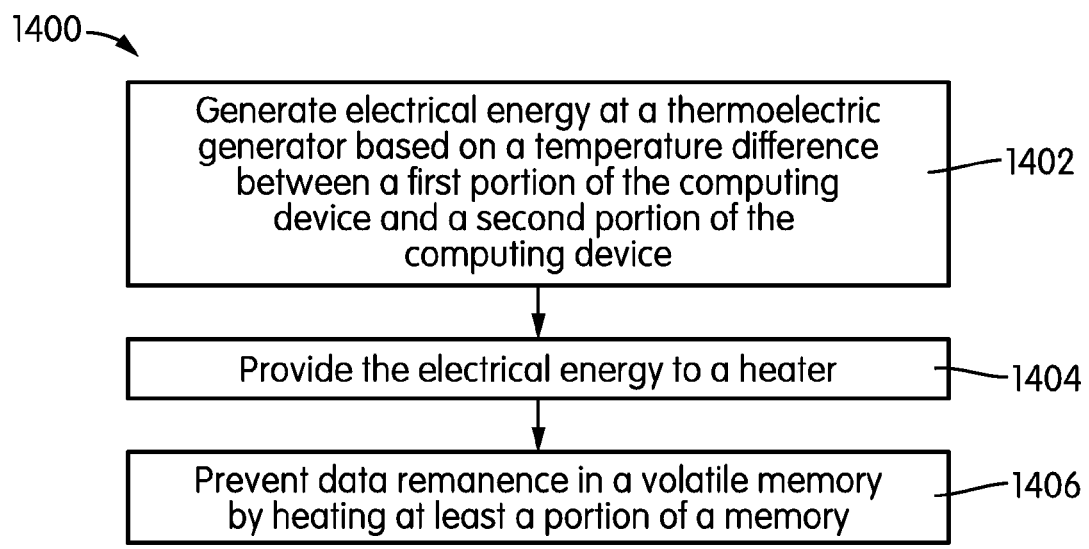
FIG. 14 is a flowchart of a process for use with a memory in a computing device, shown according to another embodiment.

Referring now to FIG. 14, a flow diagram of a process 1400 for use with a memory in a computing device is shown, according to another exemplary embodiment. The process 1400 uses a temperature difference across the computing device to provide energy to a heater to erase the data in a memory chip. The process 1400 includes generating electrical energy at a thermoelectric generator (e.g., the thermoelectric generator of FIGS. 3-4) based on a temperature difference between a first portion of the computing device and second portion of the computing device (step 1402). In one embodiment, the first portion may be disposed on the memory of the memory chip. In another embodiment, neither portion may be disposed on the memory of the memory chip. The process 1400 further includes providing the electrical energy to a heater (step 1404) and preventing data remanence in a volatile memory by heating at least a portion of the memory (step 1406). The heater provides heat to the memory which prevents or reduces data remanence by accelerating (e.g., inhibiting deceleration) of decay of memory bits.

Figure 15:
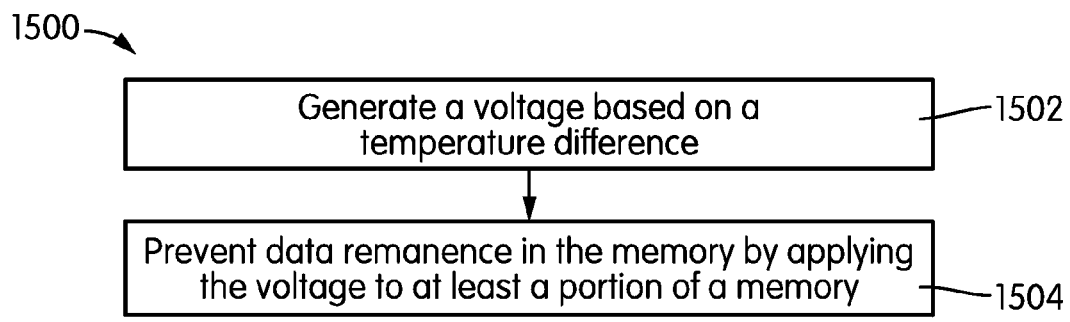
FIG. 15 is a flowchart of a process for use with a memory in a computing device, shown according to another embodiment.

Referring now to FIG. 15, a flow diagram of a process 1500 for use with a memory in a computing device is shown, according to another exemplary embodiment. The process 1500 uses voltage to change bits stored in the memory. The process 1500 includes generating a voltage based on a temperature difference (step 1502). The temperature difference may be across a memory chip or across any portion of the computing device. The process 1500 further includes preventing or reducing data remanence in the memory by applying the voltage to at least a portion of the memory (step 1504). For example, the voltage may change some or all of the bits to zeroes or change some or all of the bits to ones.

Figure 16:
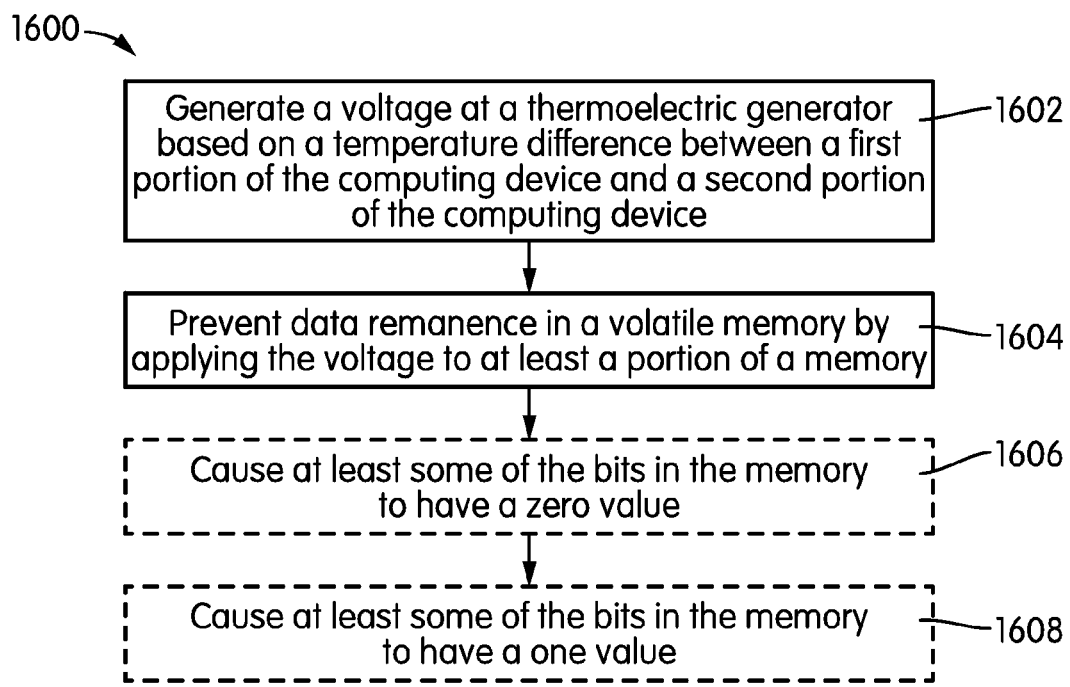
FIG. 16 is a flowchart of a process for use with a memory in a computing device, shown according to another embodiment.

Referring now to FIG. 16, a flow diagram of a process 1600 for use with a memory in a computing device is shown, according to another exemplary embodiment. The process 1600 uses voltage to change bits stored in the memory. The process 1600 includes generating a voltage at a thermoelectric generator based on a temperature difference between a first portion of the computing device and a second portion of the computing device (step 1602). The process 1602 further includes preventing or reducing data remanence in a volatile memory by applying the voltage to at least a portion of a memory (step 1604). The voltage may cause the bits in the memory to change value. For example, at least some of the bits in the memory are caused to have a zero value (step 1606) or cause at least some of the bits in the memory to have a one value (step 1608) in response to the voltage.

Referring generally to FIGS. 17-24, systems and methods for protecting sensitive data in a memory of a computing device are shown. In the embodiments of FIGS. 17-24, remanence decay values may be determined (e.g., calculated, characterized, etc.) for volatile memory or portions of volatile memory (e.g., one or more memory sites, bits of memory, bytes of memory, sectors of memory, etc.). Remanence decay values represent the amount of time it takes to erase data for a given memory site. A remanence decay value may be a time, a rate, a time constant, a coefficient or exponent of a decay function, etc. A remanence decay value may be temperature dependent, i.e., a remanence decay value may be a function of temperature. Using the remanence decay times, the most sensitive data (e.g., the data to be erased first in response to a trigger event) is placed in the memory sites with the fastest remanence decay values (e.g., shortest decay times, fastest decay rates, fastest decay values as a function of temperature, fastest decay values as a function of cooling, values leading to the fastest data decay, etc.). The volatile memory may be SRAM, DRAM, or any other type of volatile memory.

Figure 17:
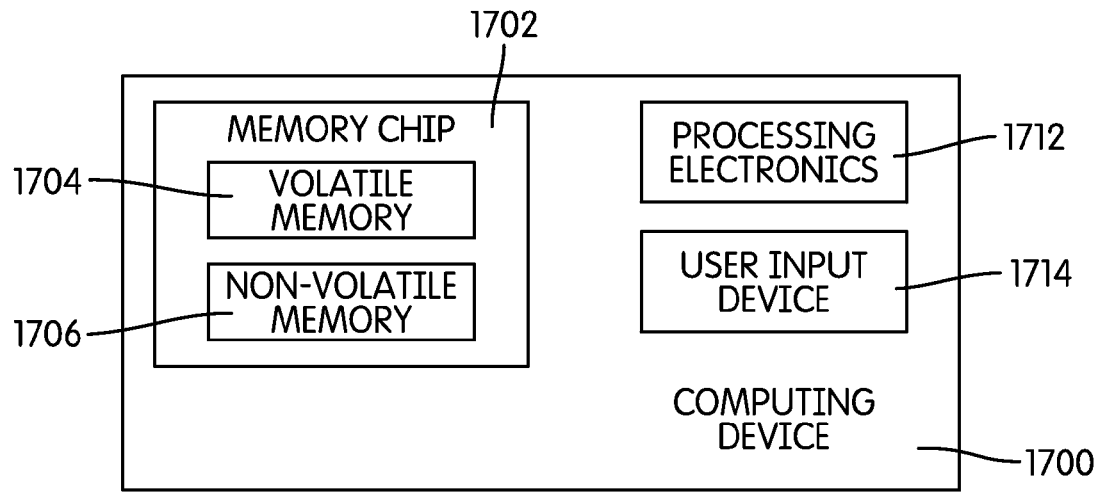
FIG. 17 is a schematic block diagram of a computing device, shown according to another embodiment.

Referring now to FIG. 17, a block diagram of a computing device 1700 is shown, according to an exemplary embodiment. The computing device 1700 may be a personal computer, server, portable communication device, personal electronic device, or other device. The computing device 1700 includes a memory chip 1702 including a volatile memory 1704 and a non-volatile memory 1706. The computing device 1700 further includes processing electronics 1712 and a user input device 1714.

Figure 18:
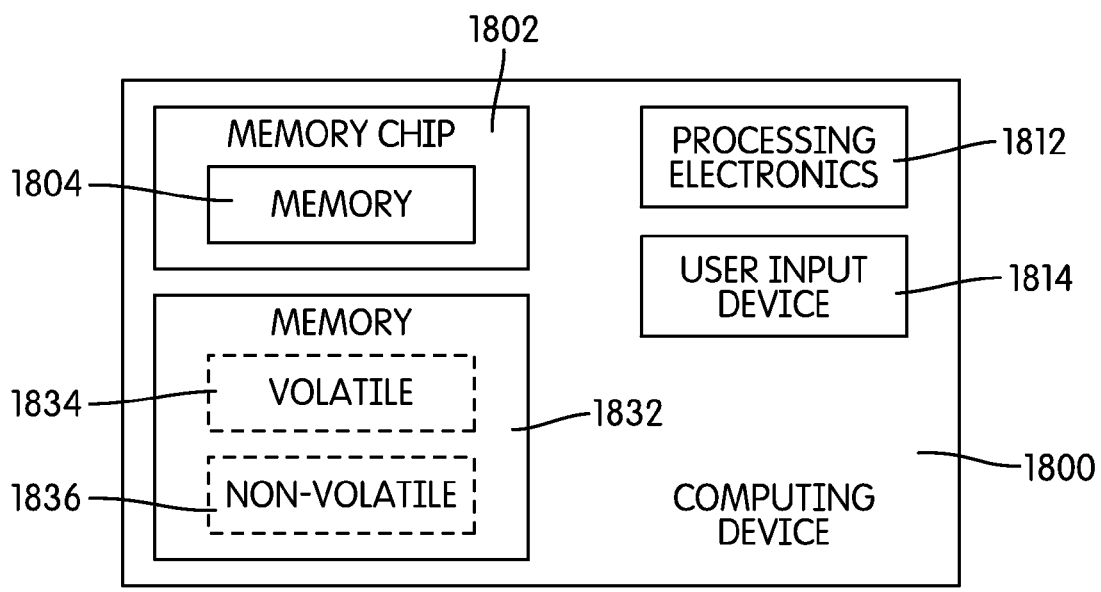
FIG. 18 is a schematic block diagram of a computing device, shown according to another embodiment.

Referring now to FIG. 18, the computing device 1800 is shown according to another exemplary embodiment. The memory chip 1802 is shown to include a memory 1804. Compared to FIG. 17, the computing device 1700 is shown to include another memory 1832 that may include a volatile memory 1034 and/or a non-volatile memory 1836. For example, memory 1832 may be another RAM chip (e.g., a second bank of RAM), cache memory, ROM, a hard drive, etc.

The memory 1704, 1706, 1804 and 1832 of FIGS. 17-18 includes multiple memory sites that are configured to electronically store data. Remanence decay values may be calculated for each volatile memory site (as described in FIG. 19) and data may be stored in the memory based on the remanence decay values. According to one embodiment, the remanence decay values may be determined before the memory chip 1702, 1806 is installed into the computing device 1700, 1800. For example, the remanence decay values may be determined at the memory factory or at the computing device factory. The remanence decay values may then be stored in non-volatile memory 1706 on the memory chip 1702 (see e.g., FIG. 17) or stored in a separate non-volatile memory 1836 that is off-board the memory chip 1802 (see e.g., FIG. 18). According to one embodiment, the memory manufacturer may provide the decay values as a file to the computing device manufacturer, and the file is stored or installed into the computing device after the memory has been assembled into the computing device.

According to another embodiment, the remanence decay values may be determined after the memory chip 1702, 1802 is installed into the computing device 1700, 1800. The decay values may be determined by, for example, a program or application on the computing device 1700, 1800 and may be stored in volatile memory 1704, 1804, 1834 or non-volatile memory 1706, 1836. The decay values may be stored on the same memory chip (e.g., memory chip 1702, 1802) or in another memory. For example, the characterization of the decay values of a first memory 1804 may be stored in a second memory 1834, and vice versa. Accordingly, a computing device may operate off of the second memory 1834 while removing power from the first memory 1804 to determine remanence decay values, and vice versa. Remanence decay values may be determined once, or may be re-determined on a regular or irregular time or event (e.g., startup, shutdown, etc.) basis. According to one embodiment, decay values are determined at startup of the computing device and stored in volatile memory. According to another embodiment, decay values are determined at shutdown and stored in non-volatile memory.

Figure 19:
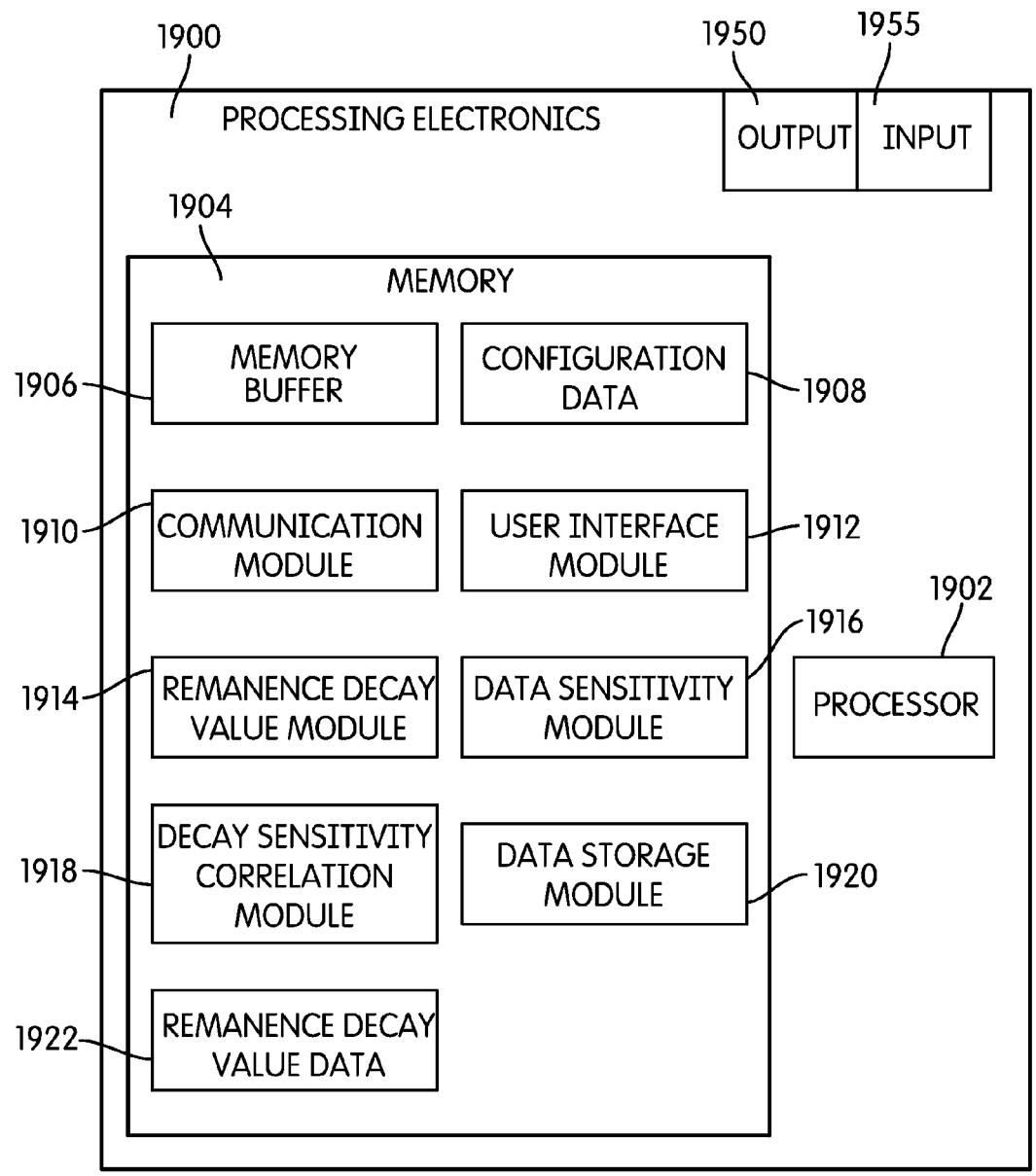
FIG. 19 is a detailed block diagram of the processing electronics of the computing devices of FIGS. 17 and 18, shown according to an exemplary embodiment.

Referring now to FIG. 19, a more detailed block diagram of the processing electronics 1900 is shown, according to an exemplary embodiment. The processing electronics 1900 may be the processing electronics 1712, 1812 of the embodiments of FIGS. 17 and 18. The processing electronics 1900 may be configured to determine remanence decay values for the memory chip and memory of FIGS. 17-18 and determine where to store data in the memory 1702, 1802 or 1832 of FIGS. 17-18. For example, the processing electronics 1712 may determine that a particular portion of the volatile memory 1704 has the fastest remanence decay value and may store the most sensitive data in that particular portion of the volatile memory 1704.

The processing electronics 1900 is shown to include a processor 1902 and memory 1904, which may be similar to the processor 1002 and memory 1004 as described in FIG. 10. The memory 1904 includes a memory buffer 1906, configuration data 1908, communication module 1910, and user interface module 1912 which may have similar functionality of the memory buffer 1006, configuration data 1008, communication module 1010, and user interface module 1012 of the processing electronics of FIG. 10. The memory buffer 1906 may store signals, representations of signals, or data until accessed by another module 1910-1920. Configuration data 1908 may include information about the memory (e.g., speeds, single or double data rate, error checking, etc.).

The memory 1904 includes a remanence decay value module 1914. The remanence decay value module 1914 is configured to determine remanence decay values for one or more memory sites of a memory. For each memory site, the remanence decay value module 1914 determines a value representative of a rate or time it takes for the memory site to lose its data (i.e., for a memory bit to decay or become unrecoverable upon removal of power from the volatile memory). In one embodiment, the value is represented as a period of time the memory site takes to decay. In another embodiment, the value is represented as a decay rate representing the rate at which bits in the memory site are erased. In other embodiments, the remanence decay values are temperature dependent.

The remanence decay value for each memory site may be stored in, for example, remanence decay value data 1922. The remanence decay value data 1922 stores the remanence decay value for each memory site and provides the values to a data storage module 1920 or decay sensitivity correlation module 1918 for determining which data is stored in which memory site. The remanence decay value data 1922 may be stored in any type of data structure. For example, the remanence decay values and corresponding memory site may be stored in a table, array, database, etc.

The table or other data structure may be updated with new remanence decay values when provided by the remanence decay value module 1914. According to an exemplary embodiment, the remanence decay value module 1914 may periodically recalculate remanence decay values based on a pre-set schedule or other non-scheduled event. For example, the remanence decay value data 1922 is updated after regular time intervals or irregular time intervals. As another example, the remanence decay value data 1922 is updated each time the computing device is powered on or off. As yet another example, the remanence decay value data 1922 is updated in response to a user command or software command.

Updating the remanence decay value data 1922 may include overwriting an initial set of remanence decay values already stored. The initial set of remanence decay values may have been determined before the memory was installed in the computing device. As one example, the decay value data may be determined via a factory test and the data is provided to the user of the computing device. As another example, a hardware test of the actual computing device may be performed to determine the remanence decay value data 1922 initially. According to another embodiment, the remanence decay values may initially be determined after installation of the memory on the computing device, either via a hardware test or via software (e.g., computer code instructions executable by the processor 902) in the remanence decay value module 1914.

According to various exemplary embodiments, the remanence decay value data 1922 may be stored outside of the memory 1904. For example, the remanence decay value data 1922 may be stored in a volatile or non-volatile memory of the computing device as shown in FIG. 18 (away from the memory chip), in a volatile or non-volatile memory of a memory on a memory chip as shown in FIG. 17, or in a database that may be accessed over a network (e.g., the internet, local area network, etc.).

The memory 1904 includes a data sensitivity module 1916. The data sensitivity module 1916 is configured to determine sensitivity of data to be stored in a memory of the computing device. For example, encryption keys, encryption program parameters, and other encrypted data may be determined to be sensitive data by the data sensitivity module 1916, while other unencrypted data or operating system files may be determined to be less sensitive. The data sensitivity module 1916 classifies all the data to be stored in a memory of the computing device such that the other modules of the processing electronics 1900 place the data in the appropriate memory site.

The memory 1904 includes a decay sensitivity correlation module 1918. The decay sensitivity correlation module 1918 is configured to correlate the sensitivity of the data (determined by module 1916) with the remanence decay values (determined by module 1914). For example, the most sensitive data is correlated with the fastest remanence decay values, i.e., those leading to the fastest data decay. The correlation may be based on the type of data. For example, if the data is an encryption program parameter or encryption key, the data may be correlated with the fastest remanence decay values. The correlation may be based on comparing the remanence decay values to a threshold value. For example, the most sensitive data may be stored in memory sites where the remanence decay values are faster than the threshold value. The decay sensitivity correlation module 1918 may be configured to prioritize data based on the level of sensitivity, or may be configured to simply bifurcate the data into sensitive versus non-sensitive groups. The threshold value may be set by a user or automatically determined by the processing electronics 1900.

The memory 1904 includes a data storage module 1920. The data storage module 1920 is configured to receive correlation information from module 1918 and use the correlation information to assign the data to its respective memory site.

In order to prevent burn-in of the data in a given memory site over a long period of time, the data storage module 1920 may be configured to change the memory site of a portion of the data on a given schedule or based on trigger condition events. In one embodiment, the data storage module 1920 is configured to move data between memory sites with similar remanence decay values. The process of moving the data from one memory site to another includes comparing remanence decay values of memory sites to a threshold value and moving the data to a memory site having a remanence decay value faster than the threshold value. For example, the data storage module 1920 may only store encryption keys in memory sites having at least a first decay rate, whereas generally encrypted data may be stored in memory sites having at least a second decay rate, the second decay rate slower than the first decay rate.

The processing electronics 1900 further includes an output 1950 and input 1955. The output 1950 is configured to provide an output to any component of the computing device as described above. Outputs may include, for example, a command to specific data in specific memory sites. The input 1955 is configured to receive data from the various components of the computing device as described above.

Figure 20:
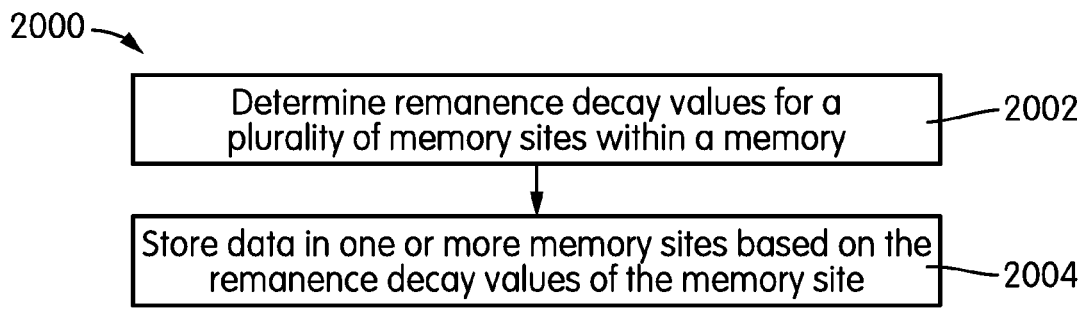
FIG. 20 is a flowchart of a process for protecting sensitive data stored in a memory of a computing device, shown according to an exemplary embodiment.

Referring now to FIG. 20, a flow diagram of a process 2000 of protecting sensitive data stored in a memory of a computing device is shown, according to an exemplary embodiment. The process 2000 includes determining remanence decay values for a plurality of memory sites within a memory (step 2002). The remanence decay values may be determined by, for example, the remanence decay value module 1914 of FIG. 19. The remanence decay values may be periods of time or decay rates, according to an exemplary embodiment. The process 2000 further includes storing data in one or more memory sites based on the remanence decay values of the memory sites (step 2004). The data is stored in a memory site by, for example, the data storage module 1920 of FIG. 19. The memory site includes at least one bit configured to electronically store data.

Figure 21:
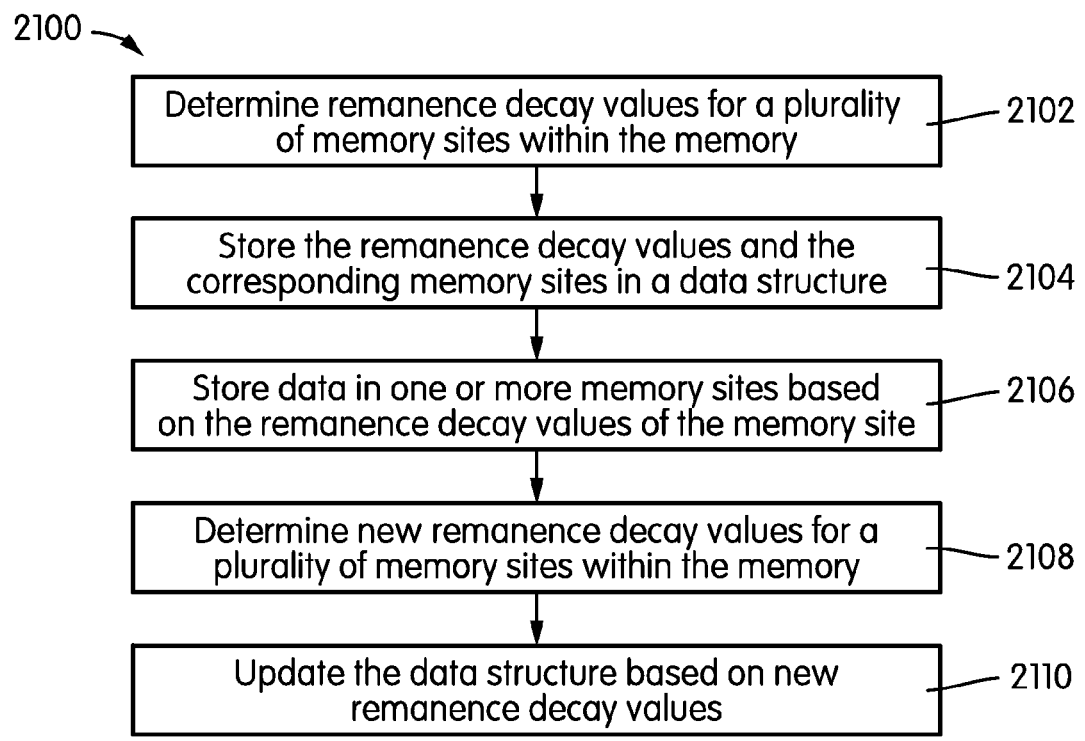
FIG. 21 is a flowchart of a process for protecting sensitive data stored in a memory of a computing device, shown according to another embodiment.

Referring now to FIG. 21, a flow diagram of a process 2100 of protecting sensitive data stored in a memory of a computing device is shown, according to another exemplary embodiment. The process 2100 includes determining remanence decay values for a plurality of memory sites within a memory (step 2102). The process 2100 further includes storing the remanence decay values and the corresponding memory sites in a data structure (step 2104). The data structure may be a table, according to one embodiment. The process 2100 further includes storing data in one or more memory sites based on the remanence decay values of the memory site (step 2106). The process 2100 further includes determining new remanence decay values for a plurality of memory sites within the memory (step 2108). The new remanence decay values may be determined on a regular or irregular time interval, may be determined in response to a user command or software command, or otherwise. The process 2100 further includes updating the data structure based on new remanence decay values (step 2110).

Figure 22:
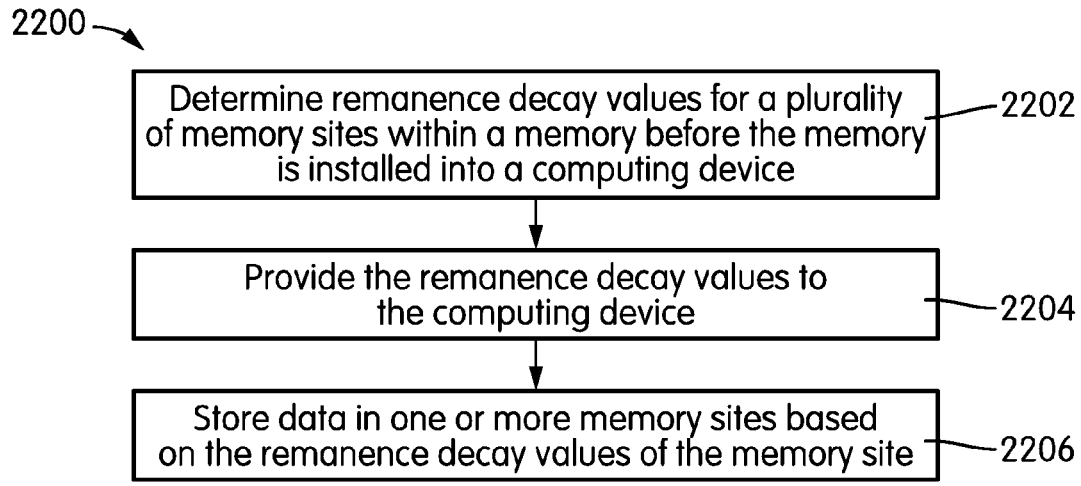
FIG. 22 is a flowchart of a process for protecting sensitive data stored in a memory of a computing device, shown according to another embodiment.

Referring now to FIG. 22, a flow diagram of a process 2200 of protecting sensitive data stored in a memory of a computing device is shown, according to another exemplary embodiment. The process 2200 includes determining remanence decay values for a plurality of memory sites within a memory before the memory is installed into a computing device (step 2202). The process 2200 further includes providing the remanence decay values to the computing device (step 2204) and storing the data in one or more memory sites based on the remanence decay values of the memory site (step 2206). While step 2202 is executed before the memory is installed within a computing device, other processes (e.g., process 2100) may then be executed later (e.g., after the memory is installed into the computing device) that overwrites the remanence decay values determined in step 2204.

Figure 23:
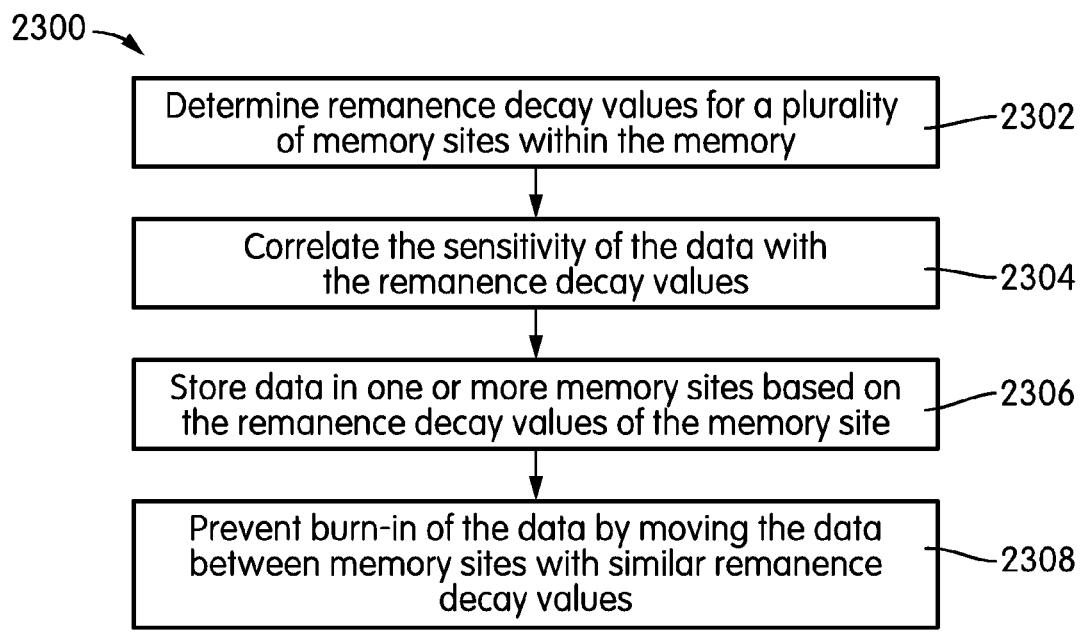
FIG. 23 is a flowchart of a process for protecting sensitive data stored in a memory of a computing device, shown according to another embodiment.

Referring now to FIG. 23, a flow diagram of a process 2300 of protecting sensitive data stored in a memory of a computing device is shown, according to another exemplary embodiment. The process 2300 includes determining remanence decay values for a plurality of memory sites within the memory (step 2302). The process 2300 further includes correlating the sensitivity of the data with the remanence decay values (step 2304). Step 2304 may be executed by, for example, a decay sensitivity correlation module 1918 shown in FIG. 19. The correlation may be based on the type of data. For example, encryption keys or program parameters may be classified as sensitive data. The correlation may also be based on a comparison of the remanence decay values to a threshold value. For example, the memory sites with remanence decay values faster than the threshold value may be used to store the most sensitive data.

The process 2300 further includes storing data in one or more memory sites based on the remanence decay values of the memory site (step 2306). Step 2306 may include storing the most sensitive data in memory sites with the fastest remanence decay values. The process 2300 further includes preventing burn-in of the data by moving the data between memory sites with similar remanence decay values (step 2308). Step 2308 may be executed by, for example, the data storage module 1920 of FIG. 19. Step 2308 may include comparing the remanence decay values to a threshold value and moving the data to the memory sites having remanence decay values faster than the threshold value.

Figure 24:
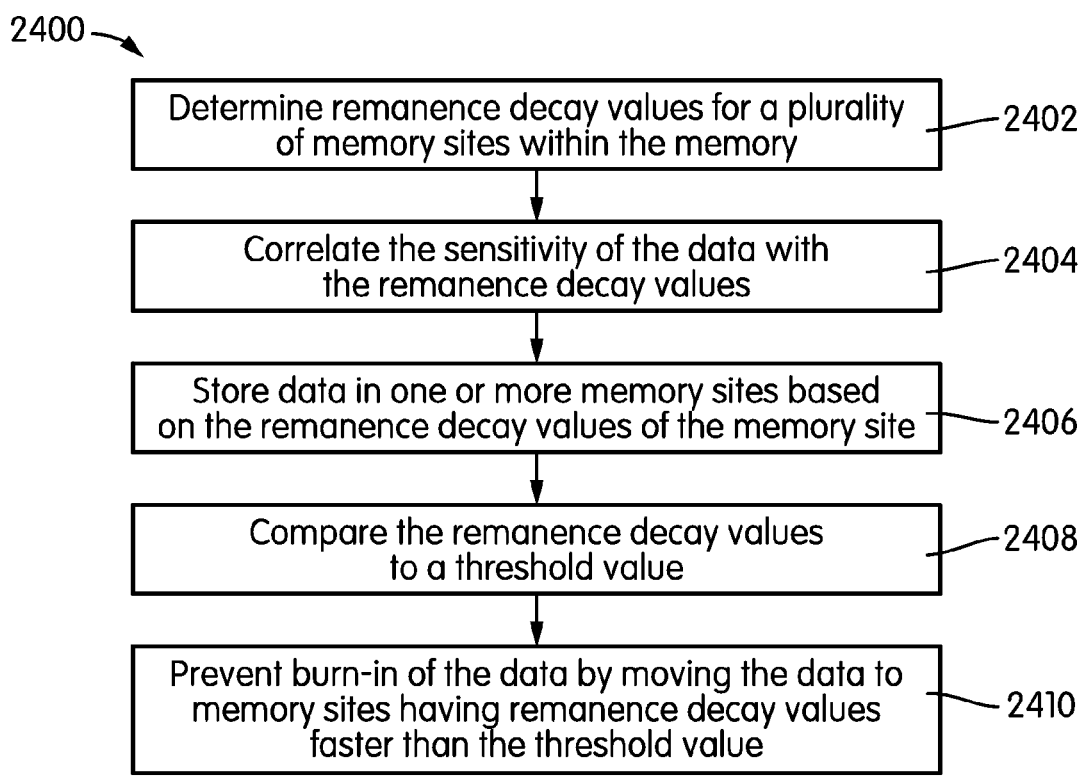
FIG. 24 is a flowchart of a process for protecting sensitive data stored in a memory of a computing device, shown according to another embodiment.

Referring now to FIG. 24, a flow diagram of a process 2400 of protecting sensitive data stored in a memory of a computing device is shown, according to another exemplary embodiment. The process 2400 includes determining remanence decay values for a plurality of memory sites within the memory (step 2402). The process 2400 further includes correlating the sensitivity of the data with the remanence decay values (step 2404). The process 2400 further includes storing data in one or more memory sites based on the remanence decay values of the memory site (step 2406). The process 2400 further includes comparing the remanence decay values to a threshold value (step 2408). The comparison may be made by, for example, a decay sensitivity correlation module 1918 or data storage module 1920 of FIG. 19. The process 2400 further includes preventing burn-in of the data by moving the data to memory sites having remanence decay values faster than the threshold value (step 2410).

Volatile memory is generally susceptible to cold attacks because the data remanence of the memory increases (i.e., the decay rates decrease) as temperature decreases. According to another aspect of the disclosure, the memory itself may be configured to have a minimal increase in data remanence upon cooling of the memory. For example, the construction of the bits themselves may be impervious or less affected by lower temperatures (e.g., a cold attack). In one embodiment, the memory may include bi-polar junction transistors. The bi-polar junction transistors are configured to have a minimal increase data remanence upon cooling. Therefore, the systems and methods of the present disclosure may include storing the most sensitive data (e.g., encryption program parameters, encryption keys, other encrypted data, etc.) in the portion of the memory including the bi-polar junction transistors, allowing such data to decay earlier than other data in the memory in the event of a cooling attack. The bi-polar junction transistors may be part of a BiCMOS line (an integration of bi-polar junction transistors and complementary metal-oxide semiconductor (CMOS) technology), according to an exemplary embodiment.

Various systems and methods described above may be used separately or in conjunction with one another. For example, the heater of FIGS. 1-3 may be used in conjunction with memory overwriting of FIG. 4 and the decay sensitivity correlations of FIGS. 17-23. These systems and methods may further be used with the temperature dependent data remanence resistant memory described above. It should be understood that any combination of methods as described above may be used in the prevention of data remanence.

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and assemblies described herein may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the scope of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for storing sensitive data, comprising:
determining the sensitivity of a data; and
storing the data in a memory based on the sensitivity;
wherein the memory comprises a plurality of bits configured to electronically store the data, and wherein a portion of the memory is configured to have minimal increased data remanence upon cooling of the memory.

2. The method of claim 1, wherein the determining is based on the data comprising an encryption program parameters.

3. The method of claim 1, wherein the determining is based on the data comprising an encryption key.

4. The method of claim 1, wherein the determining is based on the data comprising encrypted data.

5. The method of claim 1, wherein the storing comprises storing data determined to be sensitive in the portion of the memory configured to have minimal increased data remanence.

6. The method of claim 1, wherein the portion of the memory configured to have minimal increased data remanence comprises bi-polar junction transistors.

7. The method of claim 1, further comprising determining remanence decay values for the plurality of bits, correlating the sensitivity of the data with the remanence decay values, and storing the data in the memory based on the correlation of the sensitivity of the data with the remanence decay values.

8. The method of claim 7, further comprising storing the remanence decay values in a data structure.

9. The method of claim 8, further comprising updating the data structure based on new remanence decay values.

10. The method of claim 9, further comprising determining new remanence decay values for a plurality of bits within the memory.

11. The method of claim 10, wherein updating the data structure overwrites an initial set of remanence decay values, and wherein the initial set of remanence decay values are determined before the memory is installed in the computing device.

12. The method of claim 7, wherein the remanence decay values are stored in a memory spaced apart from the memory chip.

13. The method of claim 7, wherein the remanence decay values are determined after the memory is installed in a computing device.

14. The method of claim 7, wherein the most sensitive data is stored in the bits with the fastest remanence decay values.

15. The method of claim 7, wherein the correlation is based on the type of data.

16. A system for protecting sensitive data in a memory of a computing device, comprising:
processing electronics configured to:
determine remanence decay values for a plurality of sites of a memory; and store data in one or more memory sites of the memory based on remanence decay values of each memory site.

17. The system of claim 16, wherein the processing electronics are further configured to store the remanence decay values and the corresponding memory sites in a data structure.

18. The system of claim 17, wherein the processing electronics are further configured to update the data structure based on new remanence decay values.

19. The system of claim 18, wherein the processing electronics are further configured to determine new remanence decay values for a plurality of memory sites within the memory.

20. The system of claim 18, wherein the data structure is updated after regular time intervals.

21. The system of claim 18, wherein the data structure is updated each time the computing device is powered on.

22. The system of claim 18, wherein the data structure is updated each time the computing device is powered off.

23. The system of claim 18, wherein updating the data structure overwrites an initial set of remanence decay values, and wherein the initial set of remanence decay values are determined before the memory is installed in the computing device.

24. The system of claim 16, wherein the processing electronics are configured to determine the remanence decay values after the memory is installed in the computing device.

25. The system of claim 16, wherein the processing electronics are configured to correlate the sensitivity of the data with the remanence decay values.

26. The system of claim 25, wherein the most sensitive data is stored in memory sites with the fastest remanence decay values.

27. A system for protecting sensitive data in a memory of a computing device, comprising:
   means for determining remanence decay values for a plurality of sites of a memory, and
   means for storing data in one or more memory sites of the memory based on remanence decay values of each memory site.

28. The system of claim 27, further comprising means for storing the remanence decay values and the corresponding memory sites in a data structure.

29. The system of claim 28, wherein the data structure is updated based on new remanence decay values.

30. The system of claim 28, wherein the data structure is updated after regular time intervals.

31. The system of claim 28, wherein the data structure is updated each time the computing device is powered on.

32. The system of claim 28, wherein the data structure is updated each time the computing device is powered off.

33. The system of claim 28, wherein updating the data structure overwrites an initial set of remanence decay values, and wherein the initial set of remanence decay values are determined before the memory is installed in the computing device.

* * * * *